United States Patent
Weiner

(10) Patent No.: US 11,386,492 B1
(45) Date of Patent: Jul. 12, 2022

(54) SYSTEM FOR TRADING PRECIOUS METALS IN AN EFFICIENT SECONDARY MARKET

(71) Applicant: Monetary Metals, LLC, Scottsdale, AZ (US)

(72) Inventor: Keith Weiner, Scottsdale, AZ (US)

(73) Assignee: MONETARY METALS & CO., Scottsdale, AZ (US)

(*) Notice: Subject to any disclaimer, the term of this patent is extended or adjusted under 35 U.S.C. 154(b) by 619 days.

(21) Appl. No.: 15/638,274

(22) Filed: Jun. 29, 2017

Related U.S. Application Data

(60) Provisional application No. 62/356,386, filed on Jun. 29, 2016.

(51) Int. Cl.
| | | |
|---|---|---|
| *G06Q 30/00* | (2012.01) | |
| *G06Q 40/04* | (2012.01) | |
| *G06Q 40/06* | (2012.01) | |
| *G06Q 30/08* | (2012.01) | |
| *G06Q 40/00* | (2012.01) | |
| *G06Q 30/06* | (2012.01) | |

(52) U.S. Cl.
CPC ............ *G06Q 40/04* (2013.01); *G06Q 30/08* (2013.01); *G06Q 40/06* (2013.01); *G06Q 30/0623* (2013.01); *G06Q 40/10* (2013.01)

(58) Field of Classification Search
CPC ..... G06Q 30/08; G06Q 40/04; G06Q 30/0623
See application file for complete search history.

(56) References Cited

U.S. PATENT DOCUMENTS

| | | | |
|---|---|---|---|
| 5,671,364 A | 9/1997 | Turk | |
| 5,983,207 A | 11/1999 | Turk et al. | |
| 6,415,271 B1 | 7/2002 | Turk et al. | |
| 6,598,026 B1 * | 7/2003 | Ojha | G06Q 30/0633 |
| | | | 705/1.1 |
| 7,143,062 B2 | 11/2006 | Turk et al. | |
| 7,206,763 B2 | 4/2007 | Turk | |
| 7,672,893 B1 * | 3/2010 | Naratil | G06Q 50/18 |
| | | | 705/37 |
| 7,827,089 B2 | 11/2010 | Sweeting et al. | |

(Continued)

FOREIGN PATENT DOCUMENTS

CN 103282934 A 9/2013

OTHER PUBLICATIONS

Rahn, Richard W., MacQueen, Bruce R., Rogers, Margaret L., "Research Study 24, Digital Money & its Impact on Gold: Technical, legal & economic issues," Published by Centre for Public Policy Studies, World Gold Council, www.gold.org, Nov. 2000, 41 pages.

*Primary Examiner* — Mila Airapetian
(74) *Attorney, Agent, or Firm* — Law Office of Karen Dana Oster, LLC

(57) ABSTRACT

A system for trading precious metals in an efficient secondary market facilitates bidding/accepting transactions between a bidder/buyer and an accepter/seller, the system may also facilitates offering/taking transactions between an offeror/seller and a taker/buyer. Alternatively, or in combination, the system may be a true gold leasing system in which title remains with the owner at all times, though the lessee may have physical custody of the metal. Alternatively, or in combination, the system may be a gold backed currency system.

12 Claims, 16 Drawing Sheets

(56) References Cited

U.S. PATENT DOCUMENTS

| | | | |
|---|---|---|---|
| 7,899,736 B1* | 3/2011 | Buck | G06Q 40/04 705/37 |
| 8,015,089 B1 | 9/2011 | Baya'a et al. | |
| 8,583,547 B2 | 11/2013 | Blasi | |
| 8,595,121 B2 | 11/2013 | Sweeting et al. | |
| 2001/0049651 A1 | 12/2001 | Selleck | |
| 2002/0087428 A1 | 7/2002 | Koide et al. | |
| 2004/0177026 A1* | 9/2004 | Balabon | G06Q 40/04 705/37 |
| 2004/0220884 A1* | 11/2004 | Khan | G06Q 50/188 705/80 |
| 2007/0078753 A1* | 4/2007 | Cormack | G06Q 40/04 705/37 |
| 2007/0094220 A1* | 4/2007 | McCaffrey | G06N 7/005 706/52 |
| 2007/0179876 A1* | 8/2007 | Stark | G06Q 40/00 705/35 |
| 2009/0210337 A1* | 8/2009 | Mahoney | G06Q 40/04 705/37 |
| 2010/0299257 A1 | 11/2010 | Turk | |
| 2011/0251927 A1 | 10/2011 | Gless | |
| 2012/0095895 A1* | 4/2012 | Aston | G06Q 40/04 705/37 |
| 2012/0109809 A1* | 5/2012 | Sweeting | G06Q 40/04 705/37 |
| 2014/0279526 A1 | 9/2014 | Jackson | |
| 2014/0279540 A1 | 9/2014 | Jackson | |
| 2014/0289078 A1* | 9/2014 | Paul | G06Q 30/0623 705/26.61 |
| 2015/0081508 A1* | 3/2015 | Schwall | G06Q 40/04 705/37 |
| 2015/0356675 A1* | 12/2015 | Schulz | G06Q 40/04 705/37 |

* cited by examiner

FIG. 13

900 — Form: 1oz Eagle Coin
Location: New York

| Bids | Asks |
|---|---|
| 901 — User #1  $28 | $30  User #3 — 912 |
| 902 — User #2  $27 | $31  User #4 — 913 |

903 — Form: 1oz Kangaroo Coin
Location: Sydney

| Bids | Asks |
|---|---|
| 904 — User #5  $20 | $25  User #7 — 914 |
| 905 — User #6  $19 | $26  User #8 — 915 |

906 — Kangaroos in Sydney for Eagles in New York

| Swaps |
|---|
| 907 — System  $10 |
| 908 — System  $12 |

909 — Eagles in New York for Kangaroos in Sydney

| Swaps |
|---|
| 910 — System  -$3 |
| 911 — System  -$1 |

SYSTEM FOR TRADING PRECIOUS METALS IN AN EFFICIENT SECONDARY MARKET

The present application is an application claiming the benefit of U.S. Provisional Patent Application No. 62/356,386, filed Jun. 29, 2016. The present application is based on and claims priority from this application, the disclosure of which is hereby expressly incorporated herein by reference in its entirety.

BACKGROUND OF THE INVENTION

Described herein is a system for trading precious metals in an efficient secondary market.

"Precious metals" include, for example, gold, silver, platinum, and palladium. Precious metals may be sold, for example, as bullion bars or bullion coins.

Precious metals trade on primary markets (e.g. COMEX) and on secondary markets (e.g. "over-the-counter"). As described herein, an "exchange" is a system or market in which commercial transactions involving precious metals can be carried out. Precious metal trading on primary market exchanges include, for example, the SPDR Gold Trust ETF (GLD) that trades on the New York Stock Exchange, Central Fund (CEF) that trades on the Toronto Stock Exchange, or any other centralized or formal precious metal primary market yet to be discovered. "Over-the-counter" (OTC) secondary markets include precious metal trading that occurs in some context other than on a centralized or formal exchange. For example, over-the-counter secondary markets for precious metals may include retailers, precious metals dealers or dealer networks, eBay®, between members of the London Bullion Market Association (London or LBMA), Monex™, or any other precious metal secondary market known or yet to be discovered.

A "bid-ask spread" (or "bid-offer spread") is the amount by which the ask price (offer price) exceeds the bid. This is essentially the difference in price between the highest price that a buyer is willing to pay for an asset and the lowest price for which a seller is willing to sell it. An efficient market is not defined as one having the "right" price, but one that has the narrowest bid-ask spread. On this basis, the secondary market for precious metals is not efficient.

Precious metals trade over-the-counter and on exchanges at bid-ask spreads of 0.05% and lower. In American Gold Eagle coins, however, this bid-ask spread is at best around 1.5%. In American Silver Eagles, this bid-ask spread is at best around 4%. At many retailers, the bid-ask spread is much larger.

The wide bid-ask spread is not due to a lack of sufficient depth in the market. In the case of Gold Eagles, the U.S. Mint averages over 700,000 ounces in sales per year (over $900 million at current prices) with total cumulative production between 1986 and 2014 of over 20 million ounces ($26 billion). In the case of Silver Eagles, the U.S. Mint sold 47 million ounces in 2015 ($820 million) with total cumulative production of 463 million ounces ($8 billion).

As FIG. 1 shows, the "premium," as quoted by leading precious metals dealer Monex™, varies widely over time. The "premium" is excess amount the total selling price ("gross price") charged to the buyer is above the market value of a precious metal (also referred to as "metal value"). As FIG. 2 shows, implied premiums for Gold Eagles on auction site eBay® have much greater (i.e. worse) variability than large bullion bars in the professional market, and are often sold at premiums significantly above those offered by a precious metals dealer. The premiums of other government minted legal tender bullion coins show similar premium variability.

When one considers that legal tender coins are one of the most widely accepted and marketable forms of precious metals, the wide bid-ask spread and premium variability is indicative of a grossly inefficient secondary market. This inefficiency is due to three factors: the way precious metals are traded and priced in secondary markets, the lack of information, and the lack of escrow and authentication services.

1. The Way Precious Metals are Traded and Priced in Secondary Markets.

The spot price for precious metals in their wholesale form in over-the-counter markets like LBMA or exchange-traded products like GLD or Comex futures is widely known and the price changes in real-time. Anyone looking to buy or sell physical precious metals in other smaller bar or coin forms thus knows with certainty what the metal value of the pure gold or silver in the product is worth. Professional traders and dealers also have in mind a premium for the form of the metal (e.g. American Gold Eagle coin) and location.

The way physical bullion is traded however is based on the way normal goods and services are traded, that is, by quoting a total fixed (gross) price. This method is too inflexible for a good where the known metal value fluctuates second by second. The problems with this method are exemplified by the way precious metals are traded on eBay®. The auction site has been successful in narrowing the bid-ask spread and price volatility on a wide range of goods. However, it has failed to do so with precious metals.

The eBay® auction model enables a seller to set a minimum bid, or a reserve. This will protect the seller from selling below cost plus a minimum margin. However, in the precious metals markets (indeed any investment), the concept of a cost of acquisition plus margin does not apply—they are not consumer goods for resale. There is a current market price that determines the metal value of the pure gold or silver in the product. What the seller paid for it is irrelevant to the market.

Setting a reserve price then becomes a problem. If the spot price of gold or silver drops such that the reserve price is above the metal value of the pure gold or silver in the product, then the auction is unlikely to close as all market participants can see that the product's reserve price is well above its metal value. Alternatively, if someone bids slightly above the reserve value just before the spot price drops, he has a perverse incentive to refuse to pay. Bidders may also be reluctant to bid too close to the market price of the metal, lest they get caught by this trap.

If a seller does not set a reserve price, then he risks someone being able to buy his precious metals far below their market worth, especially if his auction is not well publicized.

Given the frequent variability in the spot price of gold or silver, why does an auction stay open for a few days in the first place? It is to give the potential buyers time to find the auction and bid the price to the fair value.

eBay® has an additional problem, that it does not present a consolidated market. Precious metal coins are fungible, yet each one is in a separate auction. Further, there is no way to consolidate them into one. Nor is there a way to identify the locations of the products and differences due to freight or other costs.

A long auction period, such as a few days, may allow potential buyers time to find each coin auction listing, but it exacerbates the problem of price movement after the reserve is set and after bids have been made.

eBay®'s other pricing method is the Buy-It-Now price. In this case, the seller has to set a price high enough that even if the spot price moves up before someone buys, there is little risk that the product will sell below the product's fair price, being the product's metal value plus the seller's minimum acceptable margin. This results in prices being set unnecessarily high, resulting in many auctions that end with no sale. In addition, if the price of gold or silver moves down, then the auction is unlikely to find a buyer. eBay® is just one secondary market. There also exist peer-to-peer forums (see, for example, silverstackers.com) where identical problems exist.

BullionVault® is another company that allows users to directly enter bid and ask prices on metal (fractions of large bars, in this case). However, it also has the same problem as eBay®, in that the price is entered in absolute dollar terms. For example, if the spot price is currently $1,300 then one can bid $1,290. If the gold price drops, your bid may be hit and your order filled. If the price rises, your order will never be filled.

Similar problems also exist in the case of professional precious metals dealers. While dealers have the capability to adjust their gross prices more frequently, as they have access to live wholesale spot price feeds and the ability to hedge the metal value of their transactions, this is easier for primary (or newly minted/supplied) products where premium costs from the refineries/mints are known and sale volumes can be planned to a fair degree.

Supply of secondary bars and coins by the public to a specific dealer in a specific location can be highly variable, introducing uncertainty for the dealer as to whether the product purchased can be resold. Dealers have to hold inventory, which means they incur the cost of financing and hedging. This needs to be factored into the price paid, along with possible refining costs if the product cannot be resold. The combination of volatile spot prices and tight margins means that there is little room for dealers to absorb price hikes and equally little tolerance among the buying public to pay too much if the price drops.

The professional precious metals dealer distribution chain is thus optimized for a one-way flow of product from manufacturing source to end buyer, and not as well the other way if there are more sellers than buyers. An analogy would be if a customer brings a gallon of milk to a grocery store, and asks the store to buy it. The store business model is highly optimized to buy from distributors and sell to retail, not the other way around. The store likely has all the inventory that it calculates will sell, and so has no need for more. In addition, the store has likely fully committed its capital so it may not have cash to pay for the milk.

To buy from the retail walk-in customer, the coin shop will have to start making phone calls to find another dealer, hoping to catch him just before he places an order from his upstream supplier. Given the uncertain risk and certainty of spending time trying to place the coin, dealers typically make a low bid on customer bullion.

2. The Lack of Information.

While precious metals dealers interact with more buyers and sellers and thus have a better sense of the state of supply and demand in the market, this often only extends to their local market or that of the wholesale distributor(s) that they deal with. If the product bought back is not soon resold, the dealer will need to ring its wholesaler to see if they will buy secondary product, which is not guaranteed, or alternatively, the dealer can call other dealers it knows to see if they have a demand for whatever particular form the dealer is overstocked with at that time. They will also need to consider the cost of shipment to get the product to the wholesaler or fellow dealer. In the worst case, the dealer will need to send the unwanted product to a refiner and pay additional costs to have the metal melted, assayed, and refined.

The result is that precious metals dealers set a wide bid-ask spread on various bars and coins in the secondary market because there is uncertainty as to whether they will be able to sell them quickly in the local market and what eventual costs they may incur to offload the unwanted product.

In the case of eBay® and other peer-to-peer marketplaces, the lack of information as to the supply and demand balance for various forms of gold or silver at various locations, and the costs of shipping them to where they can be sold, is even more opaque, resulting in even wider bid-ask spreads.

It is difficult or impossible for anyone to maintain an accurate picture of localized shortages or gluts, or to address them efficiently. Dealers who spend a lot of time on the phone selling customer carry-in bullion may get a small snapshot, but it describes conditions only for certain locations and only for an instant in time.

3. The Lack of Escrow and Authentication Services.

Fake bars and coins have been an increasing problem in precious metal markets, as the technological skill of fraudsters improves. While professional precious metals dealers have equipment and skill to detect such fakes, they are scammed from time to time. There are now fakes coming from China that have a tungsten core and coating of gold. Tungsten has the same density as gold, so these fakes have the right weight. The gold coating is thick enough that the image quality is crisp like a genuine gold coin. In addition, the gold coating is thick enough to pass an XRF (X-ray fluorescence) test.

In the case of peer-to-peer markets, the problem is much worse, and unless one buys from frequent sellers who have good reputations, there is a high risk of paying for fake gold or silver. Discussion forums are filled with complaints about a lack of response by auction website operators to shut down fraudsters. There are no escrow services that will authenticate precious metal products and adjudicate disputes, and precious metals dealers are not willing to provide this service as they see eBay® and similar websites as competitors.

U.S. Pat. No. 8,583,547 to Blasi (the "Blasi reference"), U.S. Patent Publication No. 2002/0087428 to Koide et al. (the "Koide reference"), U.S. Patent Publication No. 2011/0251927 to Gless, II (the "Gless reference"), and Chinese Patent Application No. CN103282934A are incorporated herein in their entirety.

Gold Payments

Central banks globally have been managing the interest rate in most currencies downward. In some countries (e.g. Switzerland), the interest rate is negative. In other countries (e.g. the United States), the interest rate available to bank depositors is practically zero. Debt at every level has been rising exponentially for decades.

The risk to creditors is high and rising. At the same time, there is no reward to creditors. Therefore, creditors seek an alternative. Gold is often creditors' asset of choice for alternative investments because it is the only financial asset that is not someone else's liability.

Gold, however, is metal. It is not easy or convenient to use as a financial asset. The banking system has delivered many innovations since gold coins last circulated. People do not want to go back to having purses containing bits of metal.

They need a modern gold-based currency system, if they are to have a viable alternative to a conventional dollar deposit in a bank account.

Systems to address the inconvenience of using physical gold metal as a method of payment were developed in the mid-1990s with e-Gold® (launched late 1996) being the most notable with other systems including e-Bullion, Pecunix, Webmoney, Crowne Gold, Goldmoney®, and Liberty Reserve. Many of these prior art systems are no longer in operation or ceased allowing transfers of metal between customers (as Goldmoney® did in 2012). There has recently been renewed interest in gold payment systems with Bitgold™'s acquisition of Goldmoney® in 2015, and CMO Inc.'s development of a successor to e-Gold® (see U.S. Patent Application Publication No. 2014/0279526 to Jackson (the "Jackson '526 reference") and U.S. Patent Application Publication No. 2014/0279540 to Jackson (the "Jackson '540 reference")).

All prior art gold payment systems stipulate that every account or unit of currency has to be backed by 100% physical gold reserves: a one-to-one relationship of the gold to the account unit/currency. This stipulation requires these systems to undertake three key functions: (1) issuance and storage of the physical gold; (2) conversion between fiat currencies and gold; and (3) transfer of gold balances/currency between user accounts.

Most such systems involve a single issuer of the gold balances/currency who stores gold across multiple vaults and controls account transfers, with multiple conversion agents. Implementation of these key functions differs, with some systems performing all functions while others seek to separate the functions across different legal entities and additionally involving other third parties such as auditors, escrow agents, and trustees.

Whether the three functions are performed by a single entity or by multiple entities, each function has associated costs that require fees:
  (1) Storage—The cost of insured custody of physical gold is a percentage of the value of gold held. This cost is usually covered by storage fees charged to users. This fee causes a disincentive to hold gold within the gold currency system.
  (2) Conversion—The cost of buying and selling the gold that backs the system is incurred with every transaction. This cost is usually covered by a transaction fee charged to users. This fee causes a wider bid-ask spread on the gold currency.
  (3) Transfer—The cost of operating the system and effecting transfers between accounts is usually covered by transfer fees of either a fixed amount per transfer or a percentage of value transferred. This fee causes friction that tends to discourage transactions.

Depending on the operator's strategy and target market, one or more of these fees may be subsidized, via higher fees on another function. Such cross-subsidization is fraught with risk, however, as usage patterns cannot be guaranteed to remain stable. In any case, the total costs across the three functional areas have to be borne by users of the system one way or another.

In the case of the transfer function, to compete with conventional fiat currency banking account transfers, fees are often low or waived entirely. The two other functional costs are much harder to reduce and cross-subsidize, though Bitgold™ offers free storage (which appears to be subsidized by the company's investors, for now).

In the case of storage fees, their ongoing nature means that any attempt to price them below cost or at zero depends on either frequent account transfers and/or conversion between gold to and from fiat currencies. The experience of Goldmoney® shows that most people use these systems as online gold storage accounts rather than for payment functionality or high frequency speculative trading (with the leverage of futures contracts being more attractive for speculative purposes). This results in infrequent conversion fee revenues that cannot offset ongoing storage costs if users hold gold balances in such systems for any extended period of time.

In the case of conversion fees, when a new participant wants to join the system, gold must be purchased. Such purchases occur at the ask price in the gold market, plus a markup for the system operator or one of its agents. When the participant wants to cash out, the gold must be sold. It has to be sold at the bid price, and again there is a fee taken by the system operator. The total round trip cost of getting fiat currency in and then out of the system, or the bid-ask spread, can be significant. It is 1% in the case of Goldmoney®. A user who exchanges dollars for a Goldmoney® metal holding and then immediately exchanges a Goldmoney® metal holding for dollars loses 1% of his money.

No matter who pays, the cost of the bid-ask spread and ongoing storage constitutes a powerful disincentive to use the system for payment purposes. People always have a domestic alternative that incurs no such storage or conversion costs: fiat currency bank accounts. In the case of international payments, foreign currency conversion costs are incurred, but these can be comparable if not less than the bid-ask spread incurred using gold payment platforms. There is also the additional impediment that compared to a foreign currency payment, which involves only two currencies (for example USD to GBP), the use of a gold payment system requires two conversions (for example, USD to Gold then Gold to GBP) and the second conversion is not automatic and has to be initiated by the receiver, when a foreign currency payment using the banking system will result in the currency (for example, GBP) being automatically deposited into the receiver's account without any further action being required. All of these issues are akin to friction in a machine, making it hard to get the machine to start moving and prone to stopping unless constant or increasing effort is applied.

Proof of the severity of this friction is the fact that after twenty years no gold payment system has gained mainstream traction and use. The usage prior systems have gained has largely been as an online way to buy and store gold, but not to make payments.

The cost disadvantage of 100% backed gold payment systems was identified early, with a December 2000 research study (https://www.gold.org/news-and-events/press-releases/research-study-24-digital-money-its-impact-gold) by the World Gold Council, stating:

"[B]ecause of the dual requirements to ensure the integrity of the system with gold denominated reserves and to minimise transaction costs, a substantial part of reserves would ideally be invested in interest-bearing, gold-denominated financial instruments of undoubted quality and marketability. This would ensure that the reserves would earn a positive return (in gold terms, of course) and reduce the need for transaction fees. It is probably no exaggeration to say that the rarity of top quality, interest-bearing gold denominated financial instruments is the single most important impediment to the development of a competitive gold currency."

Including gold-denominated financial instruments or securitized packages of gold loans made by bullion banks as reserve assets of a gold payment system, however, introduces credit risk that most users would consider unacceptable when compared to systems whose reserve assets involve direct title to physical gold in a vault.

Prior art gold payment systems therefore face a dilemma, either they:

(1) Eliminate default risk and establish confidence in the integrity of their system by backing the account unit/currency with insured vaulted physical gold, but which results in costs that dissuade payment use; or (2) Eliminate the costs of storage, transfers, and conversion to make the system viable for payments by using interest-bearing gold-denominated financial instruments, but using such financial instruments introduces default risk and distrust in the stability of the system.

The following references are incorporated herein in their entirety: U.S. Pat. No. 5,671,364 to Turk, entitled Method and System for Commodity-Based Currency for Payment of Accounts and Elimination of Payment Risk (the "Turk '364 reference"); U.S. Pat. No. 5,983,207 to Turk et al., entitled Electronic Cash Eliminating Payment Risk (the "Turk '207 reference"); U.S. Pat. No. 6,415,271 to Turk et al., entitled Electronic Cash Eliminating Payment Risk (the "Turk '271 reference"); U.S. Pat. No. 7,143,062 to Turk et al., entitled Electronic Cash Eliminating Payment Risk, herein referred to as the "Turk '062 reference"); U.S. Pat. No. 7,206,763 to Turk, entitled Method And System For Commodity-Based Currency For Payment Of Accounts (the "Turk '763 reference"); U.S. Patent Application Publication No. 2010/0299257 to Turk, entitled Method And System For Commodity-Based Currency For Payment of Accounts (the "Turk '257 reference"); U.S. Pat. No. 8,015,089 to Baya'a et al., entitled System And Method For Providing A Pre-Paid Commodity-Based Credit Account (the "Baya'a '089 reference"); U.S. Patent Application Publication No. 2014/0279526 to Jackson, entitled Systems and Methods for a Private Sector Monetary Authority (the "Jackson '526 reference"); and U.S. Patent Application Publication No. 2014/0279540 to Jackson, entitled Systems and Methods for a Private Sector Monetary Authority (the "Jackson '540 reference").

BRIEF SUMMARY OF THE INVENTION

Described herein is a system for trading precious metals in an efficient secondary market.

Disclosed herein is a system for trading precious metals in an efficient secondary market, the system facilitating bidding/accepting transactions between a bidder/buyer and an accepter/seller, the system facilitating offering/taking transactions between an offeror/seller and a taker/buyer. The system preferably includes an available precious metal memory, a desired precious metal memory, an available precious metal searcher, a desired precious metal searcher, and a transaction coordinator. The available precious metal memory receives input of available precious metal and live pricing of precious metal. The desired precious metal memory receives input of desired precious metal and live pricing of precious metal. The available precious metal searcher is for searching the available precious metal memory for available precious metal. The desired precious metal searcher is for searching the desired precious metal memory for desired precious metal. The transaction coordinator is for facilitating a transaction if the available precious metal searcher produces a match or the desired precious metal searcher produces a match. The system may further include a comparer for comparing available precious metals in the available precious metal memory with desired precious metals in the desired precious metal memory. The system may further include a comparer and an alerter. The comparer is for comparing available precious metals in the available precious metal memory with desired precious metals in the desired precious metal memory. The alerter is for sending alerts if the comparer produces a match. The transaction coordinator is further for facilitating a transaction if the comparer produces a match.

Disclosed herein is another system for trading precious metals in an efficient secondary market for use by a plurality of users. The precious metal is preferably a precious metal coin or bar or other physical form of precious metal. The system includes means for implementing a bidding/accepting transaction and means for implementing an offering/taking transaction. The means for implementing a bidding/accepting transaction including at least one user entering a bid price on precious metal, where the bid price is preferably specified as a spread price, the spread price being a spread to a reference price for precious metal. The means for implementing a bidding/accepting transaction also including at least one user accepting the bid price to sell precious metal. The means for implementing an offering/taking transaction including at least one user entering an offer price on precious metal, where the offer price is preferably specified as a spread price, the spread price being a spread to the reference price for precious metal. The means for implementing an offering/taking transaction also including at least one user taking the offer price to buy precious metal. The precious metal may be locationless. The precious metal may be delivered to/from a specified location. The spread price may be specified in a currency or a different metal or as a percentage of the reference price. There may be at least one locationless bid and offer, at least one location-specified bid and offer; and at least one user may buy at the at least one locationless offer and sell at the at least one location-specified bid, or buy at the at least one location-specified offer and sell at the at least one locationless bid. The user may not buy or sell, but enters a spread price at which he is willing to buy or sell. The user may simultaneously buy one form of precious metal at the offer price and sell another form at the bid price. The bid price may be for a fraction of a unit of precious metal or the offer price may be for a fraction of a unit of precious metal. At least one bid and offer may be of a first kind and another at least one bid and offer may be of a second kind, and the at least one user buys using a first kind at the offer price and sells using a second kind at the bid price. The system may display horizontal spreads as net prices; and provide a way for users to indicate in which kinds of horizontal spreads they are interested. The system may assess a fee to at least one of the plurality of users, wherein the system assesses a different fee to users based on whether they enter a bid or offer, or whether they take a bid or offer. A user can indicate a desired kind of precious metal and spread price.

Disclosed herein is a computer-implemented method for trading precious metals in an efficient secondary market executed using a trading system. The method facilitates bidding/accepting transactions between a bidder/buyer and an accepter/seller. The method also facilitates offering/taking transactions between an offeror/seller and a taker/buyer. Using an available precious metal memory of the trading system, the system may receive input of available precious metal from at least one offeror/seller, the input including an offer spread. Using an available precious metal memory of the trading system, the system may receive input of live pricing of precious metal, the input being a current metal value. Using a desired precious metal memory of the trading system, the system may receive input of desired precious metal from at least one bidder/buyer, the input including a bid spread. Using a desired precious metal memory of the trading system, the system may receive input of live pricing of precious metal, the input being a current metal value. Using an available precious metal searcher of the trading system, the system may search the available precious metal memory for available precious metal at a specific offer spread. Using a desired precious metal searcher of the trading system, the system may search the desired precious metal memory for desired precious metal at a specific bid spread. Using a transaction coordinator of the trading system, the system may facilitate a transaction if the available precious metal searcher produces a match or the desired precious metal searcher produces a match. Using a comparer, the system may compare available precious metals at offer spreads in the available precious metal memory with desired precious metals at bid spreads in the desired precious metal memory. The available precious metal searcher may be implemented as an application running on the trading system, implementing the desired precious metal searcher as an application running on the trading system, or implementing the transaction coordinator as an application running on the trading system. The method further includes the step of facilitating a bidding/accepting transaction using the trading system, including receiving a bid price on precious metal (the bid price being specified as a spread price, the spread price being a spread to the reference price) and receiving an acceptance of the bid price to sell precious metal. The method further includes the step of facilitating an offering/taking transaction using the trading system, including receiving an offer price on precious metal (the offer price being specified as a spread price, the spread price being a spread to the reference price) and receiving a taking of the offer price to buy precious metal.

Also disclosed herein is a system for trading precious metals in an efficient secondary market for use by a plurality of users. The system preferably includes: at least one precious metal coin or bar or other physical form (precious metal); a reference price for precious metal; at least one user entering a bid price on precious metal, where the bid price may be specified as a spread to the reference price; at least one user entering an offer price on precious metal, where the offer price may be specified as a spread to the reference price; and at least one user accepting a bid price to sell precious metal or an offer price to buy.

Also disclosed herein is a system for trading precious metals in an efficient secondary market. The system facilitates bidding/accepting transactions between a bidder/buyer and an accepter/seller. The system also facilitates offering/taking transactions between an offeror/seller and a taker/buyer. The system preferably includes an available precious metal memory, a desired precious metal memory, an available precious metal searcher, a desired precious metal searcher, and a transaction coordinator. The available precious metal memory receives input (including an offer spread) of available precious metal from at least one offeror/seller as well as input (current metal value) of live pricing of precious metal. The desired precious metal memory receives input (bid spread) of desired precious metal from at least one bidder/buyer as well as input (current metal value) of live pricing of precious metal. The available precious metal searcher is for searching the available precious metal memory for available precious metal at a specific offer spread. The desired precious metal searcher is for searching the desired precious metal memory for desired precious metal at a specific bid spread. The transaction coordinator is for facilitating a transaction if the available precious metal searcher produces a match or the desired precious metal searcher produces a match. The system may include a comparer for comparing available precious metals at offer spreads in the available precious metal memory with desired precious metals at bid spreads in the desired precious metal memory. The system may include an alerter for sending alerts if the comparer produces a match between an offer spread and a bid spread. The transaction coordinator may also facilitate a transaction if the comparer produces a match. The precious metal may be locationless or may be delivered to/from a specified location. The spread may be specified in a currency or a different metal or as a percentage of the reference price.

In situations where there is at least one locationless bid and offer and at least one location-specified bid and offer, the user may buy at the locationless offer and sell at the location-specified bid, or buy at the location-specified offer and sell at the locationless bid. In situations where there is at least one locationless bid and offer and at least one location-specified bid and offer, the user may buy at the locationless offer and sell at the location-specified bid, or buy at the location-specified offer and sell at the locationless bid, and further, the user may not buy or sell, but enter a spread price at which he is willing to buy or sell. The user may simultaneously buy one form of precious metal at the offer price and sell another form at the bid. The user may simultaneously buy one form of precious metal at the offer price and sell another form at the bid, and the user may not buy and sell, but enter a spread price to buy and sell. The bid and offer may be made for a fraction of a unit of precious metal. In situations where there is at least one bid and offer may be for a whole unit of precious metal and at least one bid and offer may be for a fractional unit of precious metal, the user may buy a whole unit and sell a fractional unit. In situations where there is at least one bid and offer may be for a whole unit of precious metal and at least one bid and offer may be for a fractional unit of precious metal, the user may buy a whole unit and sell a fractional unit, and further, the user may not buy but enter a spread price at which he would like to buy and sell. In situations where there is at least one bid and offer may be for a whole unit of precious metal and at least one bid and offer may be for a fractional unit of precious metal, the user may buy a whole unit and sell a fractional unit, the may not buy but enter a spread price at which he would like to buy and sell, and the user may additionally specify a minimum threshold of fractional units. In situations where there is at least one bid and offer of one kind and at least one bid and offer of another kind, the user may buy one kind at the offer price and sell another kind at the bid price. In situations where there is at least one bid and offer of one kind and at least one bid and offer of another kind, the user may buy one kind at the offer price and sell another kind at the bid price, or the user may not buy and sell, but enter a spread price at which he would like to buy and sell. In situations where there is at least one bid and offer of one kind and at least one bid and offer of another kind, and the user may buy one kind at the offer price and sell another kind at the bid price, and the system may additionally display the horizontal spreads as net prices. In situations where there is at least one bid and offer of one kind and at least one bid and offer of another kind, the user may buy one kind at the offer price and sell another kind at the bid price, the system additionally displaying the horizontal spreads as net prices and providing a way for users to indicate in which kinds of horizontal spreads they are interested. In situations where there is at least one bid and offer of one kind and at least one bid and offer of another kind, the user may buy one kind at the offer price and sells another kind at the bid price, and the system may additionally display the horizontal spreads as net prices and signal the user that a particular spread has risen above a pre-determined threshold. In situations where there is at least one bid and offer of one kind and at least one bid and offer of another kind, the user may buy one kind at the offer price and sells another kind at the bid price, the system may additionally display the horizontal spreads as net prices, signal the user that a particular spread has risen above a pre-determined threshold, and/or provide a quick way for the user to trade the spread. In situations where there is at least one bid and offer of one kind and at least one bid and offer of another kind, the user may buy one kind at the offer price and sells another kind at the bid price, the user may not buy and sell, but enters a spread price at which he would like to buy and sell, and the user may not enter a single spread price, but enter a logical statement that may include multiple spreads and operators including AND, OR, XOR, NOR, NAND, IFF, etc. In situations where there is at least one bid and offer may be for a whole unit of precious metal and at least one bid and offer may be for a fractional unit of precious metal, the user may buy a whole unit and sells a fractional unit, and one kind may be a particular metal and another kind may be a different kind of metal. The system may assess a fee to at least one user. If the system assesses a fee to a plurality of users, the system may assess a different fee to users based on whether they enter a bid or ask, or whether they take a bid or ask. If the system assesses a fee to a plurality of users, the system may assess a different fee to users based on whether they enter a bid or ask, or whether they take a bid or ask or whether they take a bid or ask, and the system may vary the fee to bid or offer makers based on the quantity bid or offered, the spread between the bid or offer and the best bid or offer in the system, previous transaction volume, or other factors. The user can indicate which kinds of precious metal and spread prices he is interested in.

The subject matter described herein is particularly pointed out in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary systems for trading precious metals in an efficient secondary market and/or provide teachings by which the various exemplary systems are more readily understood.

FIG. 13 is a system layout of an example of a system by which users holding a different mix of, or preference for, gold assets can effect payments between each other.

Figure 1:
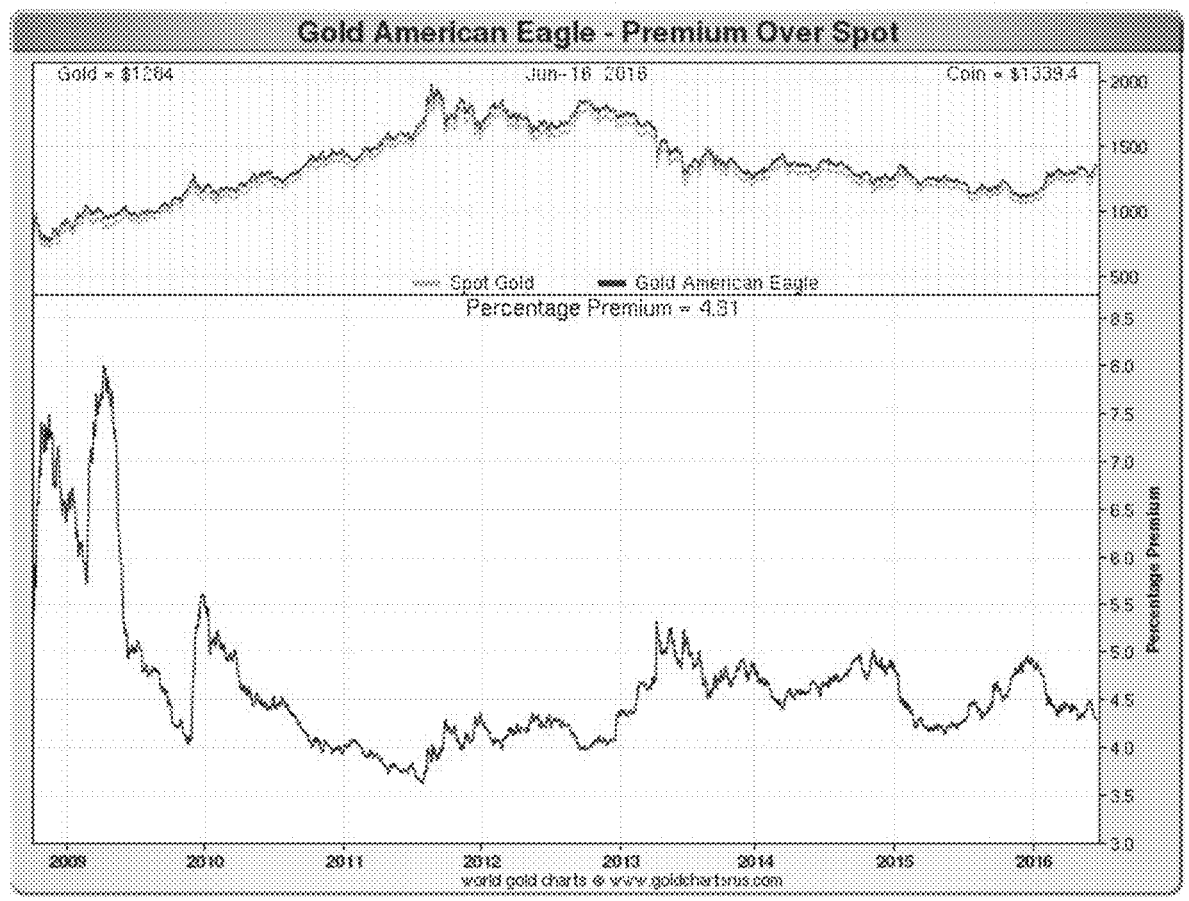
FIG. 1 is a prior art graphical chart of "premiums" as quoted by leading precious metals dealer.
Figure 2:
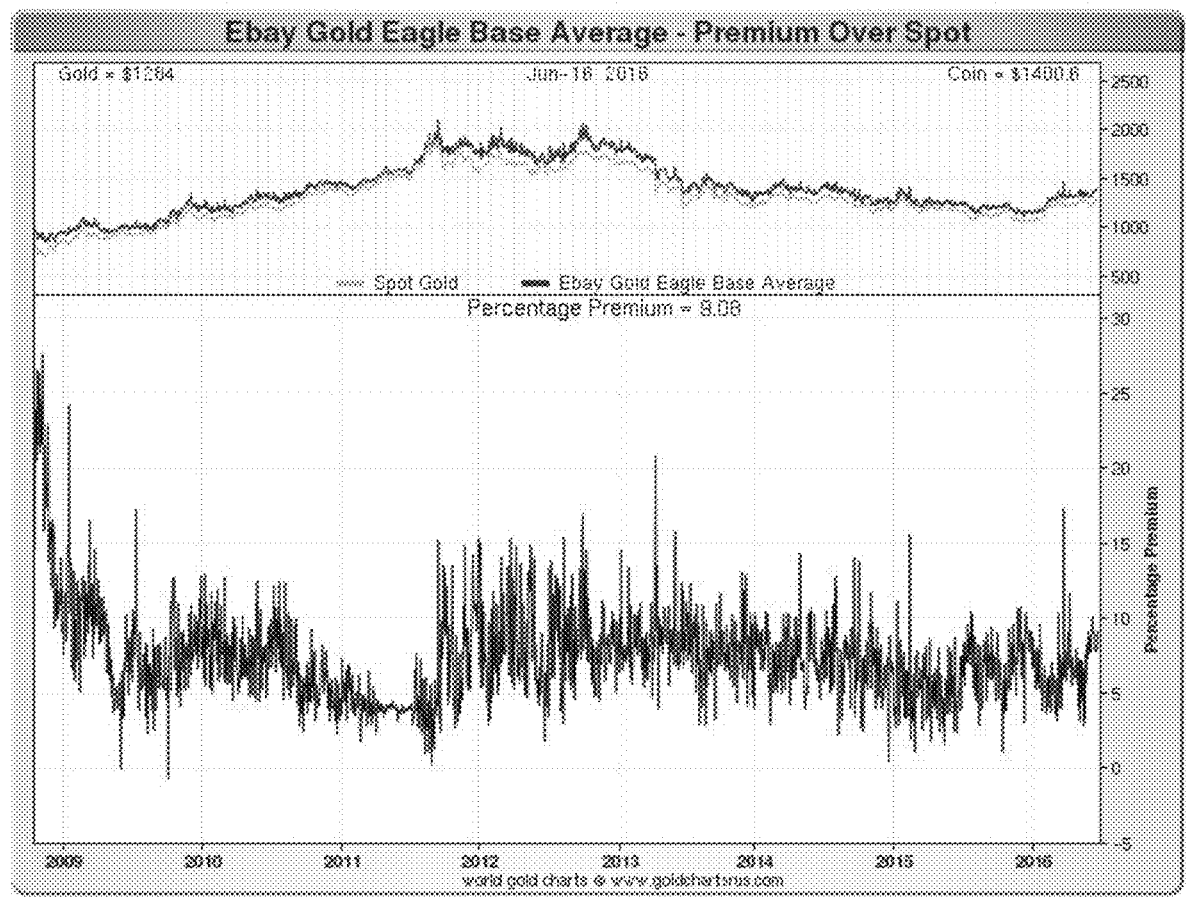
FIG. 2 is a prior art graphical chart of implied premiums for Gold Eagles on an auction site.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein is a system for trading precious metals in an efficient secondary market.

Exemplary systems for trading precious metals in an efficient secondary market may be better understood with reference to the drawings, but these systems are not intended to be of a limiting nature. The same reference numbers will be used throughout the drawings and description in this document to refer to the same or like parts. The shown shapes and relative dimensions are preferred, but are not meant to be limiting unless specifically claimed, in which case they may limit the scope of that particular claim.

Definitions

Before describing the systems for trading precious metals in an efficient secondary market and the figures, some of the terminology should be clarified. Please note that the terms and phrases may have additional definitions and/or examples throughout the specification. Where otherwise not specifically defined, words, phrases, and acronyms are given their ordinary meaning in the art. In addition to definitions set forth in the Background, the following paragraphs provide some of the definitions for terms and phrases used herein.

The phrases "precious metal gross price" or "gross price" (these phrases being used synonymously) describe the total selling price of the precious metal product. The gross price includes both a "metal value" component (the market value of a precious metal) and a "premium" component (an excess amount above the metal value).

The term "spread" is a generic term that means the difference between prices. A "bid-ask spread" is the amount by which the ask price (also referred to interchangeably as the "offer price") exceeds the bid price. This is essentially the difference in price between the highest price that a bidder/buyer is willing to pay for an asset and the lowest price for which an offeror/seller is willing to sell it. The bid price can be expressed as a "bid spread" which is the amount by which the bid price exceeds or is below a reference price. The offer price can also be expressed as an "offer spread" which is the amount by which the ask (or offer) price exceeds or is below a reference price. A "fractional spread" is the difference in price between the type of ownership (e.g. full or direct ownership of an Eagle coin v. a fractional or partial ownership of an Eagle coin). A "product spread" is the difference in price between two products of the same metal (e.g. a gold Eagle coin and a gold Maple Leaf coin, or between silver bars and silver coins). A "location spread" is the difference in price for the same product between two locations (e.g. New York and California). A horizontal spread is a generic term for an arbitragable spread (e.g. a profitable spread) including, but not limited to, location, fractional, and product spreads. Horizontal spreads may be discussed in terms of, for example, net prices.

The term "transaction" is meant to include at least two types of transactions: a bidding/accepting transaction and an offering/taking transaction. A transaction takes place between a "buyer" (which includes, for example, a bidder/buyer and a taker/buyer) and a "seller" (which includes, for example, an accepter/seller and an offeror/seller). The term "user" includes both buyers and sellers.

In a bidding/accepting transaction, a "bidder/buyer" is used herein to mean an entity (e.g. a person or a business) that submits a bid to purchase precious metals in the secondary market. If the bid is accepted by an accepter/seller and the transaction is completed, the bidder/buyer entity would be a buyer (purchaser). An "accepter/seller" is used herein to mean an entity (e.g. a person or a business) that accepts a bid to purchase precious metals in the secondary market. If the transaction is completed, the accepter/seller entity would be a seller.

In an offering/taking transaction, an "offeror/seller" is used herein to mean an entity (e.g. a person or a business) that provides an offer to sell precious metals in the secondary market. If the offer is taken by a taker/buyer and the transaction is completed, the offeror/seller entity would be a seller. A "taker/buyer" is used herein to mean an entity (e.g. a person or a business) that takes a given offer of an offeror/seller without bidding. If the transaction is completed, the taker/buyer entity would be a buyer (purchaser).

The "spot market" is a public financial market in which commodities such as precious metals are traded for immediate delivery. A spot market contrasts with a futures market, in which delivery is due at a later date.

The term "lending" generally means that title for an asset is transferred to the borrower. Although the term "leasing" is used in prior art processes, prior art processes are really "lending" because the prior art "lessor" has a gold receivable while the prior art "lessee" has the corresponding gold liability plus the physical gold asset.

The term "leasing" as used in this document means that title for an asset remains with the lessor/owner at all times. Although the lessee may have physical custody of the asset, the lessee does not put the asset on its balance sheet.

The systems described herein may have associated hardware, software, and/or firmware (a variation, subset, or hybrid of hardware and/or software). The term "hardware" includes at least one "processing unit," "processor," "computer," "programmable apparatus," and/or other known or yet to be discovered devices capable of executing instructions or steps. The term "software" includes at least one "program," "subprogram," "series of instructions," or other known or yet to be discovered hardware instructions or hardware-readable program code. Software may be loaded onto hardware (or firmware) to produce a machine, such that the software executes on the hardware to create structures for implementing the functions described herein. Further, the software may be loaded onto the hardware (or firmware) so as to direct the system to function in a particular manner described herein or to perform a series of operational steps as described herein. The phrase "loaded onto the hardware" also includes being loaded into memory associated with or accessible by the hardware. The term "memory" is defined to include any type of hardware (or other technology)-readable media (also referred to as machine-readable storage medium) including, but not limited to, attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other known or yet to be discovered storage media. Depending on its purpose, the memory may be transitory and/or non-transitory. Appropriate "communications," "signals," and/or "transmissions" (which include various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the system (the system including, for example, hardware systems and subsystems, and memory) would be used as appropriate to facilitate controls and communications. An example of computer-to-computer communications could be over, for example, Ethernet, fiber, or Wi-Fi®.

The term "associated" (and variations thereof) is defined to mean integral or original, retrofitted, attached, connected (including functionally connected), positioned near, and/or accessible by. For example, if a display (or other component) is associated with a computer (or other technology), the display may be an original display built into the computer, a display that has been retrofitted into the computer, an attached display that is attached to the computer, a nearby display that is positioned near the computer, and/or a display that is accessible by the computer.

The term "facilitating" (and variations thereof) is defined to mean making an action or process possible or at least easier.

It should be noted that relative terms (e.g. large and small) are meant to help in the understanding of the technology and are not meant to limit the scope of the invention. Similarly, unless specifically stated otherwise, the terms "primary" and "secondary" are meant solely for purposes of designation and not for order or limitation. For example, the "primary market" has no order relationship with the "secondary market."

The terms "may," "might," "can," and "could" are used to indicate alternatives and optional features and only should be construed as a limitation if specifically included in the claims. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

Trading and Pricing Precious Metals in an Efficient Secondary Market

There is a need for an improved method of trading precious metals in the secondary market. The system described herein allows bidder/buyers to set bid prices and offeror/sellers to set ask prices that move with the price of metal in the spot market. In other words, the parties involved in the transaction are making decisions based, not on the gross price of the precious metal, but the premium above or discount below the market value of the precious metal.

For example, if silver is $14.17 per ounce and the offeror/seller wants to make $1.00 per American Silver Eagle coin, then instead of setting an ask price of $15.17, he sets the ask price at spot plus $1.00. The system displays silver Eagle, offered at +$1.00. Additionally, the system knows that a Silver Eagle coin contains one troy ounce of pure silver and that the current spot price is $14.17, so the system can also display the gross price of $15.17. The system described herein displays the premium or discount to the reference price, and the gross price automatically adjusts penny for penny with changes in the spot price. If spot silver jumps to $15.00 before the coin is sold, then the gross ask price is automatically moved by the system up to $16.00. The same occurs with a bidder/buyer setting a bid price. If a bidder/buyer wants a coin for metal value plus $0.50 then he sets his bid that way. A bidder/buyer or an offeror/seller is assured that there is no sale of the coin unless his limit order (an order that is not executed if the price set is not met during the period of time in which the order is left open) is matched.

The system described herein lets parties involved in a transaction make decisions based on discount or premium, not an absolute price. For example, a bidder/buyer can make a bid, not based on absolute price, but based on the desired discount or premium. Another example is that an offeror/seller can make an offer to sell precious metals, not based on absolute price, but based on the desired discount or premium.

The system described herein differs from the prior art in that it offers a live market in discount and premium, with both bid and ask quotes. Prior art systems display a streaming quote for a particular product premium, but these prior art systems are not two-way live markets and do not have bid or ask quotes. These prior art systems have two weaknesses. First, the bidder/buyer cannot enter a bid price and wait for it to be filled. Second, there is no feedback provided to the offeror/seller. The offeror/seller has no way to discover that there is a large volume of bids just 1% below his ask price.

The system will also allow the bidder/buyer or the offeror/seller to set the discount or premium not in dollars but as a percentage. Instead of a bidder/buyer specifying that he wants to buy a Silver Eagle coin at $0.50 over metal value, he can specify that he will only buy it at metal value plus 3.5% (of metal value, that is metal value×1.035), or less.

The system enables both buyers and sellers to get a good deal. Instead of having a company that buys all coins offered (at a discount) and sells all coins demanded (at a premium), the system matches buyers with sellers. This will result in a significant narrowing of the bid-ask spread on precious metals (such as bullion bars and coins).

By splitting out the metal value and premium components, the system will make it easier for buyers and sellers to clearly see premiums and thus identify arbitrage opportunities between various forms of precious metals (e.g. bullion coins and bars of different sizes) and locations. For example, if demand for Silver Eagles is high and the premium on them is being bid up, holders of Silver Eagles who are indifferent to which brand of coin they own, could sell their Silver Eagles and buy Silver Maples if the premium on them is lower. Examples of other arbitrages include:

(a) between locations (e.g. to and/or from a specified location);
(b) between generic large bullion bars and smaller bars and coins; and
(c) between gold and silver, e.g. direct metal to metal trades, including bids and asks specified as a percentage. In this case, "price" means the gold-silver ratio.

The setting of reserves (minimum amount that will be accepted as a winning bid in an auction—reserve prices prevent the auction from being won at a price that is lower than is acceptable) in terms of premiums rather than gross price (inclusive of metal value) means that the addition of simple logic like AND and OR to join orders could allow traders to automate arbitrage opportunities. For example: IF I can sell Eagles at a $2.00 premium AND buy Maples at a $1.00 premium, THEN accept both orders. This functionality will further drive down volatility in the premiums, and compress the bid-ask spread for all products as well as product spreads and location spreads. This is because the system described herein enables different kinds of traders, and a larger number of traders, to arbitrage spreads to make a profit.

Fractional Ownership

Another example of an arbitrage is between fractional ownership and full ownership of a gold coin. Many people cannot afford to buy a whole ounce of gold (current price is $1,300 per ounce). Using the system described herein, they may place bids to buy a fraction of an ounce (for example ¹⁄₁₀₀ oz) which is more affordable.

Other participants may see the opportunity to profit by buying a whole gold Eagle and selling it off to as many fractional owners as needed.

Allowing a large number of people to own small parts of these coins will increase the market depth and liquidity, further narrowing the bid-ask spread.

Systems that allow ownership of a fraction of a bar or coin have existed for a long time (see Goldmoney® or BullionVault®). It is novel, however, for a system to facilitate a separate bid and ask on fractional ownership vs. full ownership of a coin. It gives participants a way to arbitrage this fractional spread.

Coins and Bars

By providing a bid and ask on both coins and bars, the system provides another product spread. While some market participants may demand a silver Eagle coin, others may be content with silver ownership in any form.

Participants can see the bids and asks on both. This allows arbitrage on this product spread. For example, if the premium on silver Eagle coins is 35% (which has occurred), one could sell 100 oz of coins and buy about 135 oz of generic silver in bar form (or a fraction of a larger bar). In a few months, when the premium subsides to 10%, one ends with 72 Eagles—a net gain of 22%.

The system enables similar arbitrage between various different coins, such as Eagles and Canadian Maples.

Locationless and Location

The system described herein allows for a global system bid (locationless bid) and ask (locationless ask). (Where location is specified, there would be a location-specified bid and a location-specified ask.) This consolidates all market participants, and provides the most liquidity and tightest location spread. This is locationless, that is there is no guarantee where the metal may be, and indeed, it can shift around per the buying and selling of participants. This is good when participants do not care where the metal is, just that they own X amount of it. Locationless could be used to implement unallocated or pooled gold, which is used in the industry today.

Locationless becomes a very valuable feature when contrasted to specific location metal. The system also allows for separate bids and/or offers for different locations such as cities or zip codes. The liquidity in Phoenix will not be the same as global liquidity. However, if one wants to take possession of the metal personally, or deliver metal personally, then a local site within driving distance is important.

There is one location spread between locationless metal and every location in the system. There is also a location spread between every pair of locations. These location spreads enable many arbitrage opportunities, provide local supply and demand data, and enable participants to see and choose the lowest cost of transportation when metal needs to be shipped.

Arbitrage

Many participants using the system may use it to profit from various opportunities such as from product spreads, fractional spreads, location spreads, and other spreads. It is good that there are so many unique spreads, and everyone benefits when these spreads become tighter (e.g. why should the premium on silver be higher in Los Angeles than New York, but the premium on gold is higher in New York?).

However, no one could hope to visually glance at the ask price in one market and bid in another (which is what the arbitrager must do), at least not for many markets simultaneously. It is, therefore, important to provide tools to allow the trader to build a panel of relevant spreads (e.g. a dealer in Phoenix will want to see location and product spreads that involve Phoenix), in net form (i.e. New York bid price minus Phoenix ask price). This panel displays not just bids and asks, but the various spreads the dealer is interested in to conduct a trade. For example, buy gold Eagles in Phoenix and sell them in Los Angeles. If a trader's (a person doing an arbitrage) shipping cost and other expenses such as packaging materials and labor are known, the software can subtract them, so the number displayed is the net profit the trader will realize.

Further, it is desirable to have a way for a trader to set alerts when particular spreads rise above a threshold (i.e. the deal is deemed to be worthwhile), and even a one-click method to take an arbitrage opportunity, that is to act on the product, location, fractional, or other spread. A dashboard with alerts plus a simple way to accept opportunities will make the market for these coins and bars vastly more efficient and liquid than it is now. Alerts could be by email, text message, or an "app" on the user's smartphone that makes a sound, flashes a light, or displays a screen.

Additional automatic functionality includes limit orders, stop loss orders, take profit orders, and other similar order types.

Fees for Liquidity Providers Vs. Consumers.

The system charges buyers and sellers a fee for each transaction. However, it need not assess the same fee for all users and all transactions.

Bidder/buyers who make a bid and/or offeror/sellers who make an offer are providing liquidity and, therefore, can be considered to be "liquidity providers." They are adding more value to the system than other users, who accept offers or take bids. Other users (accepter/sellers and taker/buyers) accept bids or take offers. While accepter/sellers and taker/buyers are necessary to the operation of the market, they add less value than liquidity providers (bidder/buyers and offeror/sellers). Accepter/sellers and taker/buyers can, therefore, be considered to be "liquidity consumers."

The system provides for a way to set different transaction fees for providers vs. consumers of liquidity, including no fee, lower fee, or a schedule for different fees based on how much liquidity the provider adds (e.g. how many ounces at the bid or ask price), how good the liquidity is (e.g. how far from the current best bid or ask), how important the liquidity is (e.g. how many ounces and/or how far from the best in relation to other providers—some markets may have a lot less liquidity than others), volume of total transactions, or other methods.

Lack of Information

To facilitate the above functionality the system will establish a standardized typology for precious metals. This will involve structured categories and values, such as:

Metal—gold, silver
Form—coin, bar
Type—minted, cast
Size—1 oz, 10 oz
Manufacturer—U.S. Mint®, PAMP®
Series—Eagle, Kangaroo
Year of manufacture—2001, 1995
Purity—99.99%, 99.50%

Combined together these categories/attributes define a unique "product code" or description for identical products that enable buyers to find the exact product they are after. In addition, these categories allow buyers to filter across categories that matter to them. For example, metal=gold, form=coin, manufacturer=ALL, for someone who does not care about the manufacturer. This categorization is helpful to facilitate the various arbitrages described above as it provides a structured way to define and code what is being traded.

Retail or casual buyers would use the full category description as filters but for frequent or commercial buyers or traders the system would convert the categories into an abbreviated logical product code structure, similar to how futures contracts are defined. For example the futures contract code SI8Z means Silver (SI) 2008 (8) Dec. (Z). Similarly, the system may have a code for an American Eagle Gold 1-ounce Coin as GCM1 US95—being (G) gold, (C) coin, (M) minted, (1) number of ounces, (U.S.) U.S. Mint, (95) year such as 1995.

The system will also establish standardization of locations, which, in combination with shipment cost tables from providers like FedEx® or Brinks®, will allow traders to identify profitable arbitrages between locations due to supply (selling) and demand (buying) differences at each location.

Description of Example in FIGS. 3A-3D

FIGS. 3A-3D can be thought of as a single continuous figure and may be jointly referred to as FIG. 3.

Figure 3A:
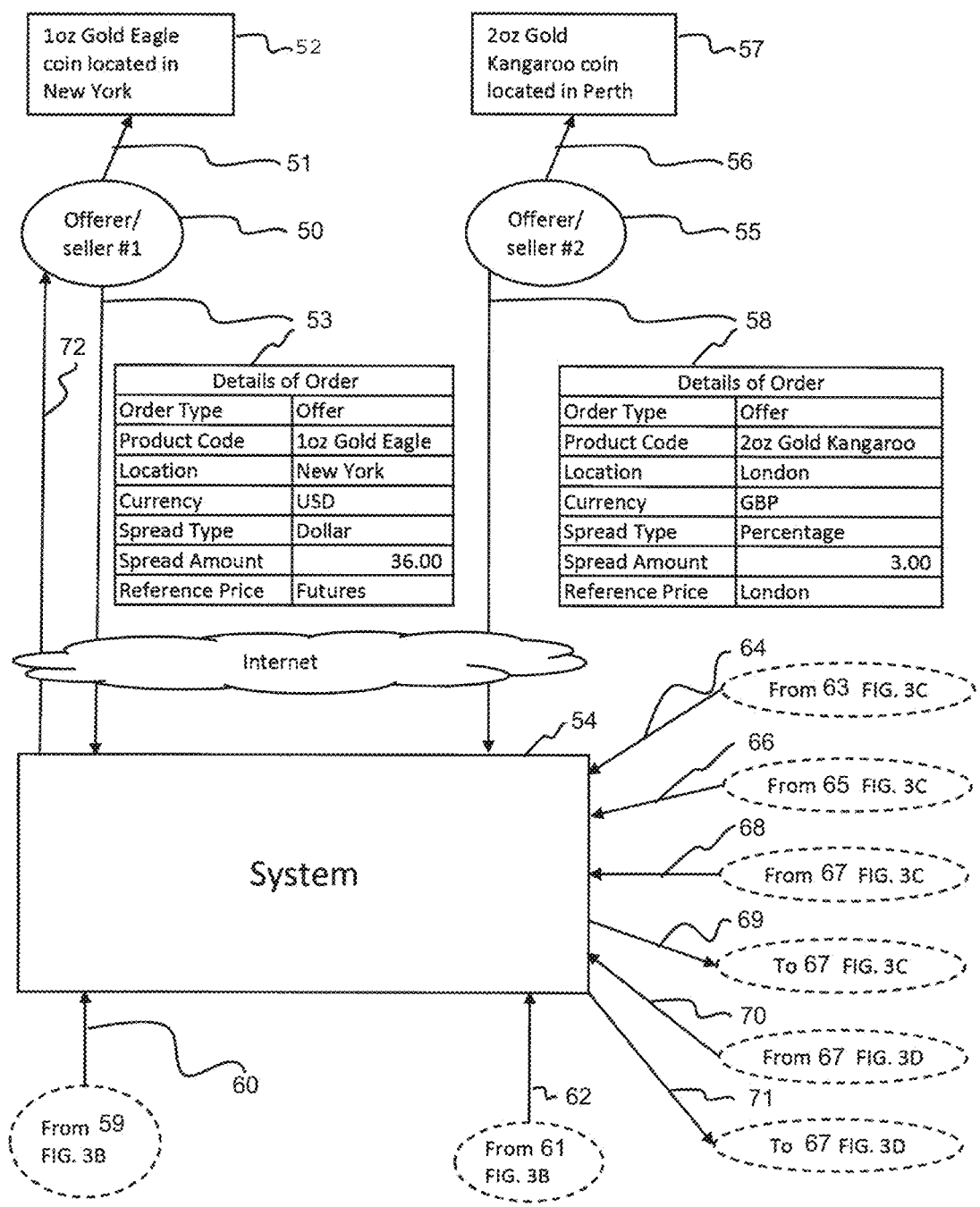
FIGS. 3A-3D are a system layout of an example of the system for trading precious metals in an efficient secondary market described herein.

Referring to FIG. 3A offeror/seller #1 50 owns 51 a 1 oz Gold Eagle coin located in a vault in New York 52. Offeror/seller #1, desires to sell his coin for $36.00 over market value. Offeror/seller #1, therefore, enters the details of his order to sell his coin 53 into the system 54 via the Internet by providing the following information: an indication of the order type (in this case, an offer to sell); a product code that describes the coin he desires to trade (that may be selected from a pre-defined list of product codes for various types of precious metals); a location (that may be selected from a pre-defined list of approved locations); a currency (that may be selected from a pre-defined list of currencies); a spread type (e.g. a fixed dollar amount per unit or a percentage of metal value); the amount of spread (in this case, $36.00); and the reference price he wishes the order to be based on (in this case, the price of a gold futures contract).

Offeror/seller #2 55 owns 56 a 2 oz Gold Kangaroo coin located in a vault in Perth 57. Offeror/seller #2 also desires to sell his coin and enters the details of his order 58 into the system 54 via the Internet in a similar manner to offeror/seller #1, except that the details selected differ with the spread amount of "3" representing 3.00% of the metal value of his coin based on a London spot market reference price.

Figure 3B:
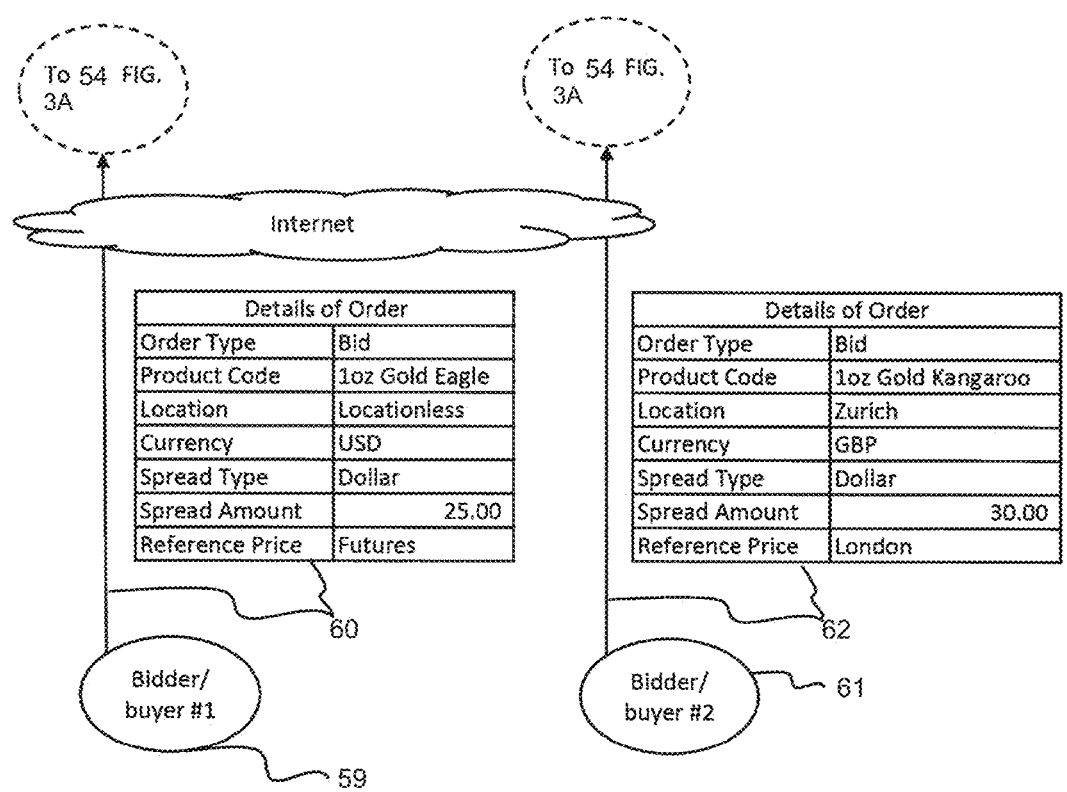

Referring to FIG. 3B, bidder/buyer #1 59 desires to buy a coin. Bidder/buyer #1, therefore, enters the details of his order to purchase a coin 60 into the system 54 via the Internet in a similar manner to offeror/seller #1, except that the details selected differ with the location being defined as locationless indicating that bidder/buyer #1 has no preference for where the coin that he buys is located as long as the other order details are fulfilled.

Bidder/buyer #2 61 also desires to buy a coin and enters the details of his order 62 into the system 54 via the Internet in a similar manner to offeror/seller #1 except that the details selected differ.

Figure 3C:
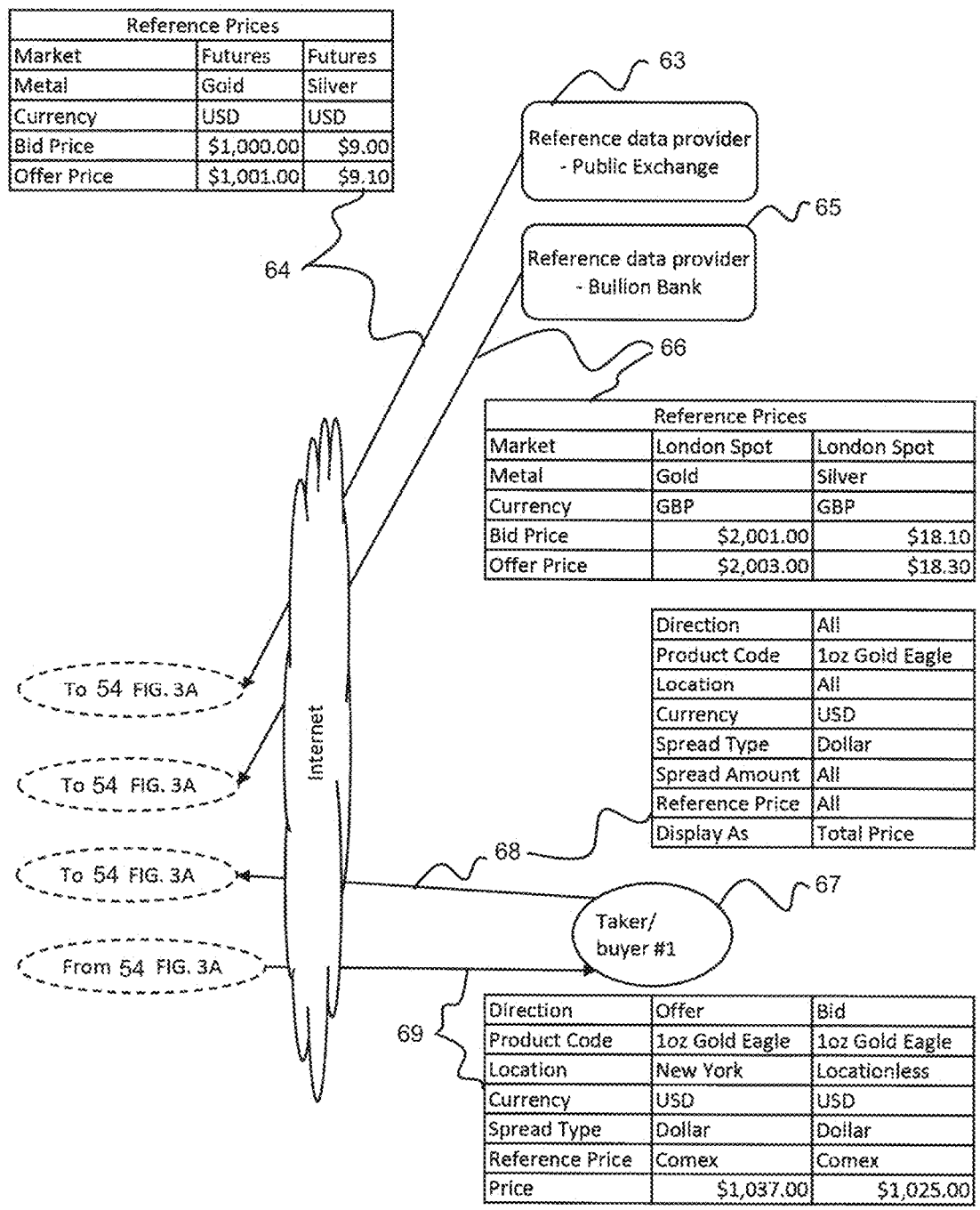

Referring to FIG. 3C the operator of the software system 54 would enter into a data licensing contract with operators of public exchanges 63 where precious metal futures or other contracts trade to access a live data feed of their bid and offer prices 64 via the Internet.

The operator of the software system 54 would also enter into data licensing contracts with Bullion Banks and other professional trading firms 65 for access to a live data feed from their trading platforms for their spot over-the-counter bid and offer prices 66 via the Internet.

Taker/buyer #1 67, desiring to buy a coin, accesses the software system 54 via the Internet and selects from the range of filters available to produce a view of the global order book showing the precious metals that meets taker/buyer #1's requirements 68, in this case 1 oz Gold Eagle coins in any location for trading in USD. The software system 54 returns a list 69 of the two orders that meet the requirements 68 back to taker/buyer #1 via the Internet. There are only two orders that meet the requirements, being those of offeror/seller #1 50 and bidder/buyer #1 59.

As taker/buyer #1 requested a gross price, the software system 54 takes the spread amount of $36 from offeror/seller #1's 50 order 53 (refer to FIG. 3A) and adds it to the futures reference offer price from the public exchange of $1001 64 multiplied by the amount of pure gold in a 1 oz Gold Eagle from the attributes sourced from the list of product codes to derive a gross price of $1037. Likewise, the software system 54 takes the spread amount of $25 from bidder/buyer #1's 59 order 60 (refer to FIG. 3B) and adds it to the futures reference bid price from the public exchange of $1000 64 multiplied by the amount of pure gold in a 1 oz Gold Eagle from the attributes sourced from the list of product codes to derive a gross price of $1025.

Figure 3D:
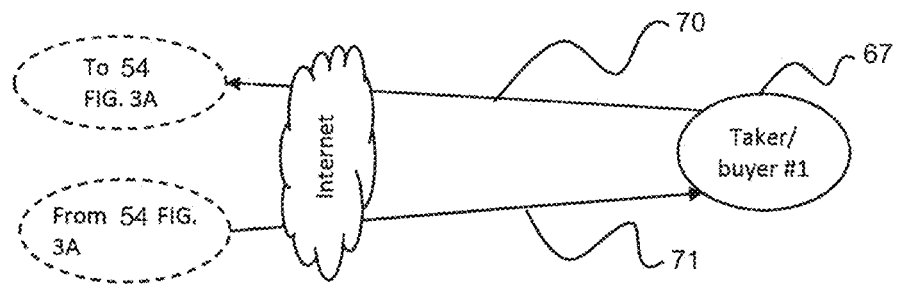

Referring to FIG. 3D, after reviewing the state of the market for 1 oz Gold Eagle coins, taker/buyer #1 67 communicates acceptance 70 via the Internet to the software system 54 of offeror/seller #1's 50 offer 53. The software system 54 confirms the transaction back to taker/buyer #1 71 and offeror/seller #1 72 (refer to FIG. 3A) via the Internet.

Gold Payments (True Gold Leasing)

A gold owner can retain ownership of his gold and earn interest on it, by "leasing" the gold out. This would be a true lease, not the "leasing" (which is actually lending) of the prior art.

Prior art processes use gold "leasing" to make money on their gold. Prior art processes, however, do not use a true lease. In prior art processes, the gold leaves the balance sheet of the lessor and goes onto the balance sheet of the lessee. The lessor has a gold receivable, and the lessee has the corresponding gold liability plus the physical gold asset. The lessor incurs credit risk if the lessee becomes insolvent and defaults on its obligations. In other words, the prior art processes are really lending, not leasing, gold. In lending, the title to the metal is transferred to the borrower. If the borrower becomes insolvent, then the gold metal is gathered with the other assets, to be liquidated for the benefit of the creditors. This not only can cause a large loss as, in a bankruptcy, creditors are often paid pennies on the dollar. Worse yet, the value of the gold is determined in dollars at the time of the default or bankruptcy filing. If the gold price rises during the time of resolving the bankruptcy, then the gold lender will get back even less of his gold. For example, John Smith lends 100 ounces of gold to Acme Inc. Later, Acme declares bankruptcy. The court determines that the price of gold is $1,250. Therefore, Smith has a claim of $125,000. It takes a year to resolve the bankruptcy. During that year, the gold price rises to $2,500. Even if Smith is paid in full, he is paid $125,000. However, at the new gold price, that is enough to buy only 50 ounces. Smith has lost half his gold. In gold terms, Smith has suffered a 50% loss.

Gold lending, therefore, incurs significant additional risks beyond dollar lending. This is one reason why in the prior art, so-called gold leasing (which is really gold lending) is not a large or public market. Bullion Banks are the primary gold lessors, and they work exclusively with clients where they can control the gold in a custodial account or where the client has a good credit rating and the Bullion Bank knows the risk. Members of the public have no access to this market.

The true gold leasing system described herein uses true gold leases. Title remains with the owner at all times, though the lessee may have physical custody of the metal. The lessee does not put the gold on its balance sheet. The lessee does not owe a gold liability, being that the gold remains the property of the lessor. If the lessee declares bankruptcy then the lessor simply repossesses the gold just as an auto company might repossess a car, or a landlord (property owner) repossess the premises.

Gold is fungible. This is both its advantage as a financial asset, as well as a challenge to preserving the elements of a true lease. In the following exemplary cases, care must be taken to identify the lessor's gold with sufficient precision to withstand legal scrutiny and a potential bankruptcy of the lessee:

- One item of gold is exchanged for another (e.g. a necklace for a ring);
- Gold in one depository is swapped for gold in another depository;
- Gold in one form is traded for gold in another form (e.g. bars for coins);
- Gold bars are exchanged for the same number of ounces of a bulk pool holding;
- A gold object is modified into another kind of object (e.g. a bar is rolled into a thin sheet);
- Third party gold is added (e.g. adding more gold when recasting a gold bar); and
- Subsequently removing third party gold (e.g. sputtering gold from a bar).

The process of establishing and operating a true lease of gold has several equally preferred variations that are presented in numbered order, but the numerical designations are for convenience only.

A first preferred true gold leasing system is a bullion dealer who needs to have inventory available for immediate delivery for customer orders. Retail gold products (e.g. bars and coins) could be kept in a depository at a convenient location for speedy delivery. When the dealer gets an order, it first transfers bulk pool gold to an account owned by the lessor. Then upon receipt of this gold, the lessor ships the retail gold product to the dealer who can then ship it to, or store it for, the buyer. When the lessor's inventory stocks are depleted, the lessor ships or swaps the bulk pool gold in its account to a refinery or mint who manufacturers it into retail gold products. This method saves on shipping cost and obtains better pricing, because it batches up orders into large commercial sizes. The gold is swapped between locations and forms, is held in the account of the lessor in storage, and is manufactured into the desired forms.

A second preferred true gold leasing system is a manufacturer of coins or bars. The manufacturer (lessee) periodically buys large gold bars, and puts the metal through a series of internal processes before outputting the final product, which is small retail bars, rounds, and coins. The amount of gold work-in-progress is relatively constant. The lessor owns a fixed amount of gold, but allows the lessee to modify the physical form of its gold at each step of the manufacturing line. When completed gold product comes off the end of the line, before it is shipped to the buyer, the lessee swaps that gold for new bars entering the beginning of the process. A variant of this system is used in a gold refinery. The refinery buys a kind of gold known as doré, a semi-pure alloy produced by a gold mine. The refinery or mint puts the gold through a series of steps and outputs commercial gold bars. The lease arrangement works similarly to the coin manufacturer.

In each of these preferred systems, the lessor charges a lease fee that the lessee must pay for the use of the lessor's gold. Thus, the lessor's gold earns a yield.

A third equally, preferred true gold leasing system is a manufacturer of products containing gold, said manufacturing using equipment that remove gold from bars to apply to the product, and said equipment not consuming the bar all the way down to zero. The base bar is the part that is not consumed in manufacturing, and the manufacturer periodically tops it up with more gold and then consumes it down to the base amount. The lease is an ideal method to finance the base amount of the gold bar, being inexpensive for the manufacturer and not placing the gold at risk of loss due to default.

A fourth equally, preferred true gold leasing system is a business that has a secured gold income, and that must pay a gold liability up front. For example, an investment fund keeps its capital in gold form. The fund manager has a sales force who sells investment in the fund to clients. The fund manager pays the sales force a commission in gold. The sales people are paid their commission up front, but the fund earns a monthly management fee based on the amount of gold assets under management. Therefore, the fund manager leases gold to pay the up-front commission. The gold assets are sitting in a depository under the control of the fund manager. The gold is contractually guaranteed to be there for a period long enough to return the leased gold so there is no credit risk.

A fifth equally, preferred true gold leasing system is an investment fund that holds gold and/or silver bars. Its objective is to increase the amount of gold it holds, by owning whichever metal is outperforming. For example, one could exchange 31 ounces of silver for one ounce of gold in 2011. Since then, the amount of silver required to buy one ounce of gold has been rising. This exchange rate is called the Gold to Silver Ratio. When the Gold to Silver Ratio is rising that means silver is becoming cheaper in gold terms. When it is falling, silver is becoming more expensive in gold terms.

When this ratio is falling, said investment fund can make more gold by holding silver. For example, if the ratio is 75 then the fund can trade 100 ounces of gold for 7,500 ounces of silver. If the ratio falls to 50, then the fund can trade those 7,500 ounces silver for 150 ounces gold. The fund has thereby earned a gain of 50%. When this ratio is rising, however, the investment fund has no way to increase its gold. The investment fund can only avoid owning silver, but then its gold does not increase.

By leasing silver, the fund can sell that silver and buy gold. When silver gets cheaper, the fund can sell some of that gold and buy the silver back to return to the lessor. For example, if the ratio is 50 and the fund lease 7,500 ounces of silver, it can exchange this silver for 150 ounces of gold. If the ratio rises to 75, the fund can sell 100 ounces of gold, buy the silver, and return it to the investor. The fund, however, keeps the additional 50 ounces of gold as its profit.

The fund can move gold out of the lease and onto its balance sheet as the Gold to Silver Ratio rises. If this ratio falls, the fund can move gold off its balance sheet and into the lease. Thus, the fund practices a method of ensuring that the precise amount of gold needed to exchange to obtain the leased silver is there. The silver lessor has neither economic exposure to the price of gold, nor credit risk to the fund. In other words, it is a true silver lease.

Another example is the fund could lease gold, sell it, and buy silver. This will enhance its return when the ratio is falling.

A sixth equally, preferred true gold leasing system involves an intermediary. That is, the gold owner leases the metal to a lessee who then, in turn, subleases it to the ultimate lessee. The intermediary may be a corporate entity that is in the business of leasing metal. For example, a company leases gold in from an investor, and then leases it out to a gold refiner.

A seventh equally, preferred true gold leasing system may occur in a pawn loan. A pawn loan involving gold occurs when a pawn customer comes in with a gold item such as jewelry. He signs a pawn loan agreement, gives it to the pawnshop for custody, and the pawnshop gives him cash based on a fraction of the gold content at the current gold price. For example, if a gold bracelet has a weight of 1-ounce of fine gold (excluding base metal content) and the gold price is $1,250 then it has a value of $1,250. The pawnshop may pay based on 80% of this, or $1,000. The customer is obliged to repay the loan plus interest within 90 days. If the customer does not repay, then the pawnshop is entitled to keep the bracelet.

As conventionally understood, this is a dollar loan with gold as collateral. In the system described herein, however, this gold-collateralized loan is separated into a base Gold Asset plus a variable Paper Asset. The pawnshop may use leased gold to finance the Gold Asset in the example provided above, and be assured that he will get the gold metal back in 90 days. It is known in advance that the gold will be returned. Whether the pawn customer repays the loan, or whether he defaults, the Gold Asset is safe.

In the repayment case, there is sufficient cash for the pawnshop to repurchase 0.8 ounces of gold to return to the lessor. Interest on pawn loans is typically 37% for 90 days. Historically, it is a very rare event that the gold price could rise more than that in such a short time. On the other hand, if he is concerned about this risk, he can purchase a deep out-of-the-money call option. In the default case, the 1-ounce gold bracelet is now owned outright. There is more than enough gold to return 0.8 ounces to the lessor. In both cases, the lessor gets his gold back. He is not exposed to the performance, credit, or default of the pawn borrower. The gold is safe whether he defaults or not. The risk is to the owner of the variable paper asset (i.e. the pawnshop owner), who may make a large positive return, but may not.

The Gold Asset is an earning asset. This is because gold metal is traded for the Gold Asset at a discount. For example, 0.78 ounces of gold may purchase an 0.80 ounce Gold Asset. Thus, a gold investor earns 0.02 ounces on his 0.78 ounces of gold. Over 90 days, this is about a 10% annualized yield on his gold.

In an eighth equally, preferred true gold leasing system, the Gold Asset in the pawnshop loan is not part of a lease transaction at all. It is a standalone asset in its own right. For example, a gold owner trades 0.78 ounces gold for said Gold Asset described above. In 90 days, the Gold Asset matures into 0.80 ounces of gold. In this system, the Gold Asset does not have an interest rate like a lease. The Gold Asset has a discount rate, that is, it is purchased at discount and matures into the full value.

The foregoing discussion of the invention is provided as enabling disclosure of a method and process to retain ownership of one's gold and earn a yield on it at the same time. A set of preferred systems were given by way of illustration of differing cases of achieving this.

Gold Backed Currency System

Having a method to achieve a yield on one's gold while still retaining ownership of it, the discussion can now return to a gold backed currency. Part II of system described herein is a currency system, with the currency itself distinct from the backing. For example, the U.S. dollar is issued by the Federal Reserve and the backing is the U.S. Treasury bond.

This system teaches a gold backed currency system where the currency is separate from the gold. The gold might be physical gold, as in the prior art, or the gold can be a true gold lease or a Gold Asset, as described above. What is important is that an entity involved in the issuance of the gold currency holds title to the gold (though not necessarily custody). In the prior art, there are several systems that require custody. In the past, gold securities have been discussed as a credit instrument, but not as a title to gold.

It is thus possible to have gold accounts, with backing in the form of any combination of physical gold, true gold leases, and Gold Assets. Account holders do not hold the physical gold, true gold leases, or Gold Assets directly. They hold gold units that are redeemable in gold, and that are backed by metal, leases, and/or Gold Assets. (There can be units of any precious metal, not just gold.)

A key characteristic of a gold backed currency is that the currency is redeemable. That is, said account holder or currency holder could exchange his account balance or currency units and get gold in return.

To guarantee redeemability, it is important that the currency system operator not put itself in the position of having to buy gold. A redemption is not a purchase. It is the reversal of the original deposit. The currency unit is created when someone deposits physical gold. Then the gold can be placed into storage or into a true gold lease or Gold Asset. At the end, the gold is simply returned. This is the key not only to reducing risk, but to a sound and honest currency.

A gold currency backed by physical gold, true gold leases, and Gold Assets, is honest and sound. 100% of the gold deposited in the system is there at all times, though its form and location may change and it may be in the custody—but not balance sheet—of a third party such as a lessee.

A preferred system is a currency issuer that issues gold currency or account balance in exchange for physical gold. It then leases out the gold, purchases true gold leases, or exchanges it for Gold Assets, retaining some physical gold for liquidity purposes. When holders redeem their gold currency or account balances, the currency issuer can access its physical gold holdings and/or terminate or exchange (sell) its true gold leases and/or Gold Assets for physical gold.

In this system, the gold currency or gold account issuer is not limited to holding gold metal only. Indeed, as discussed, holding metal incurs several costs that make it unattractive. There is a very real concern, however, around credit exposure, insolvency, and loss of one's gold. Most people are not willing to take this risk in order to save on costs. The system described herein, therefore, teaches a method in which the issuer may also hold gold in the form of true gold leases, Gold Assets, and other ways of owning title to the gold while earning a yield. The issuer may earn interest on gold, as in a true gold lease. Or it may earn a yield by buying gold at a discount, as in a Gold Asset.

Trading and Pricing Precious Metals With True Gold Leases and Gold Assets

The trading and pricing precious metals system described above was at least primarily directed to gold and silver (held in various forms or formless and at various locations or locationless) in which buyers can bid and sellers can offer not the gross price, but the price spread. The trading and pricing precious metals system can be expanded to true gold leases and Gold Assets.

Leases can be aggregated by location, or buyers may not care where the lessee is located (locationless) nor what form the gold is being held (formless). As buyers may or may not care where or in what form the gold they own is stored, they may similarly regard a lease. It is important that the exchange system allow for them to express their preference or lack of preference.

Additionally, buyers may consider the form and location of gold to be paid when the lease terminates, or may not care (locationless and/or formless).

Buyers may buy, and sellers may sell, a whole lease or a fraction thereof. As ownership of a coin can be partitioned to multiple fractional owners, the same is true for a lease. The exchange preferably additionally allows buyers and sellers to express their preference for whole or fractional leases.

Additionally, a true gold lease may have a risk or other quality rating. This rating may be determined by the exchange operator, affiliated party, independent third party rating agency, or the market participants may arrive at a rating in aggregate in similar fashion to how reputation is managed on online sites such as eBay®. Such ratings do not refer to the risk of an ordinary default as in a loan or other form of credit, but the risk of theft of the gold, complexity, and number of moving parts, the probability of operational breakdown that somehow loses the gold, jurisdictional risk, etc.

It is useful to allow buyers and sellers to express their bid and offer prices, not necessarily in terms of gross price, but in terms of spread. (Put another way, the bid price can be expressed as a spread relative to a reference price, and the offer price can be expressed as a spread relative to a reference price.) For example, a lease bid may be quoted as a price difference from a reference price. The reference price could be for a simple lease with few moving parts in a very trustworthy jurisdiction. Such a "B" rated lease may trade at a discount to an "A" rated lease.

Alternatively, a Gold Asset could be priced relative to gold itself. In this case, the bid and offer prices are really bidder-buyer and offeror/seller discount rates. For example, an offeror/seller may want to sell the Gold Asset at a discount rate of 8% and a bidder-buyer may want to buy it at a discount rate of 10%.

Once leases and Gold Assets are put on the exchange with bid and offer spread prices, something very important is enabled. For short-term fixed-income products such as a Gold Asset or many true gold leases, buying and selling in terms of interest rate can be less useful than using the discount rate as such. For example, a Gold Asset has a 90-day maturity. The Gold Asset can be spoken of as having an interest rate of 2% per annum, which means 0.50% for 90 days. One day after it is created, it has an 89-day maturity. It is easier and clearer for it to trade at a discount to the gold it redeems on maturity. If it is 100 ounces at maturity, then at inception it may be 99.5 ounces and tick upwards by about 0.006 ounces every day until the redemption value of 100 ounces is reached in 90 days.

An exchange, with bid and offer prices for leases expressed in terms of spread can easily allow buyers and sellers to bid and offer discount directly. They would not necessarily bid 99.506 ounces. The bid would be expressed as −0.494 ounces. Or alternatively, the bid could be expressed as a discount rate of 2%, with all participants understanding that this rate is quoted as an annualized percentage and the software automatically calculating and displaying what this means for this lease 89 days prior to maturity (i.e. 99.506 ounces).

There is a reason for people to quote bids and offers in terms of a normalized discount rate: it enables buyers and sellers to compare across all categories of gold yielding products including true gold leases, Gold Assets, other products that may yet be developed and even gold credit instruments such as loans and bonds. When all yield-paying products are comparable, then buyers and sellers can perform arbitrage across them. This makes the market more efficient, and lowers costs for both gold investors and gold-using businesses.

If these gold yield-paying assets are on the same exchange as gold bullion products, then each investor can determine his own balance of how much physical gold to own vs. how much and what type of gold investment product. He can set this by his time preference, risk tolerance, investment growth goals, and other factors. For example, highly risk-averse investors may decide to hold 80% as physical gold in locations in the state they live in with only 20% in yield-paying gold assets, whereas others may hold 10% as physical gold overseas and 90% in yield-paying gold assets.

This eliminates a serious flaw in all prior art systems, from Internet-based gold currencies to traditional banking. The provider makes the decisions of what form of product, where it is to be held, how much risk and yield, and even the maturity. The banking system has a term (i.e. maturity transformation) to describe how the bank offers short-term or even demand deposits to savers and uses the funds from those deposits to buy long-term loans or even home mortgages. To the extent that a financial institution has a mismatch between the asset that its depositors would have wanted to hold (had they been given the choice) and what it actually holds, it is risking a run on the bank.

In the case of prior art gold payment/currency systems that mandate 100% backing with physical gold, the gold is held in different locations and in forms that are not often preferred by holders of the system balances. These prior art systems may argue that maturity transformation is fraudulent in that it represents to holders of currency that their currency is on-call when it is backed by a non-homogenous collection of illiquid assets with different maturities. Prior art gold payment/currency systems, however, perform location transformation and form transformation by aggregating physical gold in different forms and/or locations yet representing them as fungible.

The reality is that it costs money to ship physical gold between locations, proven by the fact that the professional gold industry quotes location premiums and discounts for location swap trades. In addition, buy/sell liquidity differs between locations and individual investors would have different assessments of the jurisdiction risk of holding metal in certain countries, for example, with respect of the potential for a government to confiscate gold or restrict export of gold. Finally, most prior art gold payment/currency systems hold physical gold in the form of 400 ounce odd-weight bars, that are the preferred form in the wholesale markets. Few individuals, however, are wealthy enough to be able to redeem their system balances in such large lots, resulting in additional and often excessive costs to redeem in more convenient and widely acceptable forms, like one ounce gold coins.

In light of the foregoing, a first preferred system is a currency system that does not involve a currency unit separate and distinct from the physical gold, true gold leases, Gold Assets, and other gold yield-paying investments that back it. Historically, some major limitations prevented people from directly owning gold yield-paying investments. They could own gold coins, but even with that, they could not easily or inexpensively own fractions of a bar in highly liquid markets, nor in other jurisdictions. Nor could they own gold yield-paying investments, because the denomination was too large (and not an even multiple). Historically, a gold bill might have been drawn on a baker who accepted a pallet loaded with sacks of flour from a miller. This was a 90-day asset. It represented whatever the price of that much flour might be, for example 102.35 ounces gold.

Currency issuers provided a valuable service by taking these large and unwieldy instruments onto their balance sheets, and issuing convenient notes in small and normal denominations such as $1, $5, $10, etc. People accepted these paper notes because of their convenience. With the convenience, they also had no choice but to accept the credit risk that the issuer could become insolvent.

By using an exchange with the properties described herein, people can have all the benefits of diversification and convenient investment sizes, without that risk.

A second equally, preferred system is a currency system so designed to allow for gold payments between different users with different mix of physical gold and gold yield-paying assets. The mechanism by which various forms of gold in various locations and true gold leases and Gold Assets can be exchanged with one another is for the system to use the bids and asks of arbitrageurs, who may be indifferent to form or location, as the unit of account, in other words, to use locationless and formless gold as the unit of account.

A third equally, preferred system is a payroll system whereby employers hold any combination of physical gold, gold true leases, Gold Assets, gold bonds and other gold yield-paying securities, and employees express a preference for the forms, locations, qualities, and types of gold they wish to be paid. The system allows employers to give up the gold they have and employees to receive the gold they wish to have.

A fourth equally, preferred system is a marketplace allowing bid and offer prices on gold leases to be specified by either the lease rate or as a spread to another gold or non-gold interest rate; on Gold Assets similarly to gold leases or additionally by discount to the amount of gold at maturity, discount either being absolute in ounces or an annualized discount rate; gold loans, gold bonds, and other gold yielding instruments. The marketplace places all these forms of gold investments on an equal footing for comparison purposes. Users can prefer higher yield, jurisdiction, quality or credit rating or even crowdsource-based rating, etc. The marketplace allows preferences to be expressed and visualized by relative spreads.

A fifth equally, preferred system is a capital market that allows businesses who need various kinds of gold financing to help decide which kind of lease or asset or bond or instrument may be best, where the best source of gold is, where users want it delivered, and other variables. By taking these factors into consideration, a business may obtain its financing at a lower cost, or at a higher likelihood of closing the amount it needs. This system allows businesses that are sometimes increasing their amount of financing needed, and sometimes decreasing to make the decision based on precise costs. In some cases, these businesses may swing from net user of gold financing to net provider. For example, if a business has seasonal demand such as jewelry heading into the Christmas and wedding seasons, it may increase gold demanded when necessary, and provide its surplus gold capital at other times. If such businesses can compare rates bid and offered, they can determine if they make more profit by keeping inventory that must be financed, or by financing other businesses' needs at the cost of having less inventory for themselves.

A sixth equally, preferred system is a market maker who stands ready to buy at a discount and sell at a premium, in the case of the system described herein, discount and premium being abstracted to compensate for premium or discount based on location, form, credit or other quality, duration, and other variables displayed by the system described herein. For example, a market maker may have 1000 ounces of gold capital and a mandate to get the highest rate of return. So initially, it buys a gold lease paying 3%. Next, someone is willing to buy the lease at a premium and at the same time someone else is willing to sell a gold asset at a discount, so the net rate is 3.1%. The market maker will take both trades, and then opportunistically await the next trade.

As the system has access to data on the value of each physical form of gold at each location and the value of each gold yield-paying asset, it can easily calculate and display this underlying data as a personalized payment "price" for each user, either in ounces of the (locationless and formless) unit of account or in the user's local currency equivalent.

For example, say user B requests 10 ounces from user A for the supply some product/service to user A, but user B has recorded in the system a requirement for 1-ounce American Eagles in New York while user A holds 1-ounce Kangaroos in Sydney. Say the ask premium on user B's preferred form/location is $30 while the bid on user A's is $20 and there is no shipment cost as there are two arbitrageurs making a market in each form/location in the system. So when user A goes to pay user B 10 ounces, the system says that will cost $100 (plus system fee) in transaction fees, being 10 ounces times ($30 minus $20), and upon acceptance, will automatically execute a sale of user A's 1-ounce Kangaroos to one arbitrageur and buy 1-ounce American Eagles for user B from the other arbitrageur.

Neither user of the payment system needs to know about or see the various bids or asks of their preferred form/location as the system can perform the calculation and present it in a simple manner and execute the transactions required to affect the payment.

Alternatively, the system could display the difference between the two users' forms/locations in ounces of the unit of account, if this is the preference setting of a user. For example, say the price of locationless gold is $1,000 per ounce. In this case, the extra $100 required from user A to affect the payment is equal to 0.1 ounces. In such a case when user A enters an instruction in the system to pay user B 10 ounces, the system displays to user A that it has to send 10.1 ounces.

Similarly, this method can be extended to gold yield-paying assets, each of which has a bid and offer quotes in the market. In the case where there is no market for a gold yield-paying asset held by a user, then the system will inform the user that payment cannot be made. The system cannot guarantee that a user can make payment and nor should it, as that would be maturity transformation. If a user decides to hold a 6-month gold yield-paying asset then he has committed to a 6-month term. If there happens to be a market for his lease such that he can use it to affect payments (the conversion/change of title of which is hidden behind the scenes), then that is good for the user. If users are concerned about their ability to make payments, then they can choose to change their personalized mix of physical gold and gold yield-paying assets and hold the most marketable form/location of gold, which the system will be able to display to users by showing which form/location has had the lowest bid-offer spreads across time.

To minimize execution and payment costs, the system will factor in:
 (a) payer and recipient preferences for the forms and locations they prefer (including complex preferences utilizing multiple filters, for example, true gold leases with a maturity of less than 180 days, a risk rating less than four, located in America);
(b) allow the recipient to accept whatever form/location the payer is able to pay with or mandate payment in the recipient's preferred form/location; and
(c) where arbitrageurs are making a direct market between the recipient's and payer's gold forms/locations The objective is to calculate the most efficient combination of transactions to execute the payment instruction such that the payment is done at the lowest cost.

In this way, the proposed system eliminates maturity transformation risk by allowing each user to define their own mix of physical gold and gold yield-paying assets while allowing payments between users with different mixes of physical gold and gold yield-paying assets by simplifying the display of the payment cost and automatic execution of the conversion between the physical gold and/or gold yield-paying assets held by users.

Description of Example in FIGS. 5-12

For FIGS. 5-10 a common visual style is used to distinguish the different aspects of the true gold lease. The boxes with a thin solid line show physical gold. The boxes with a thick solid line show who has custody of the physical gold. The dotted-line boxes show who has title to the physical gold. The dashed-line boxes show who has a right to use the physical gold. Across all of the true leases, the amount of leased gold cannot fall below the amount the lessor originally leased to the lessee, so for the lessee to gain title to the lessor's physical gold the lessee must first transfer title to some other form of gold to the lessor before the lessor will transfer title of form the lessee desires.

Figure 5:
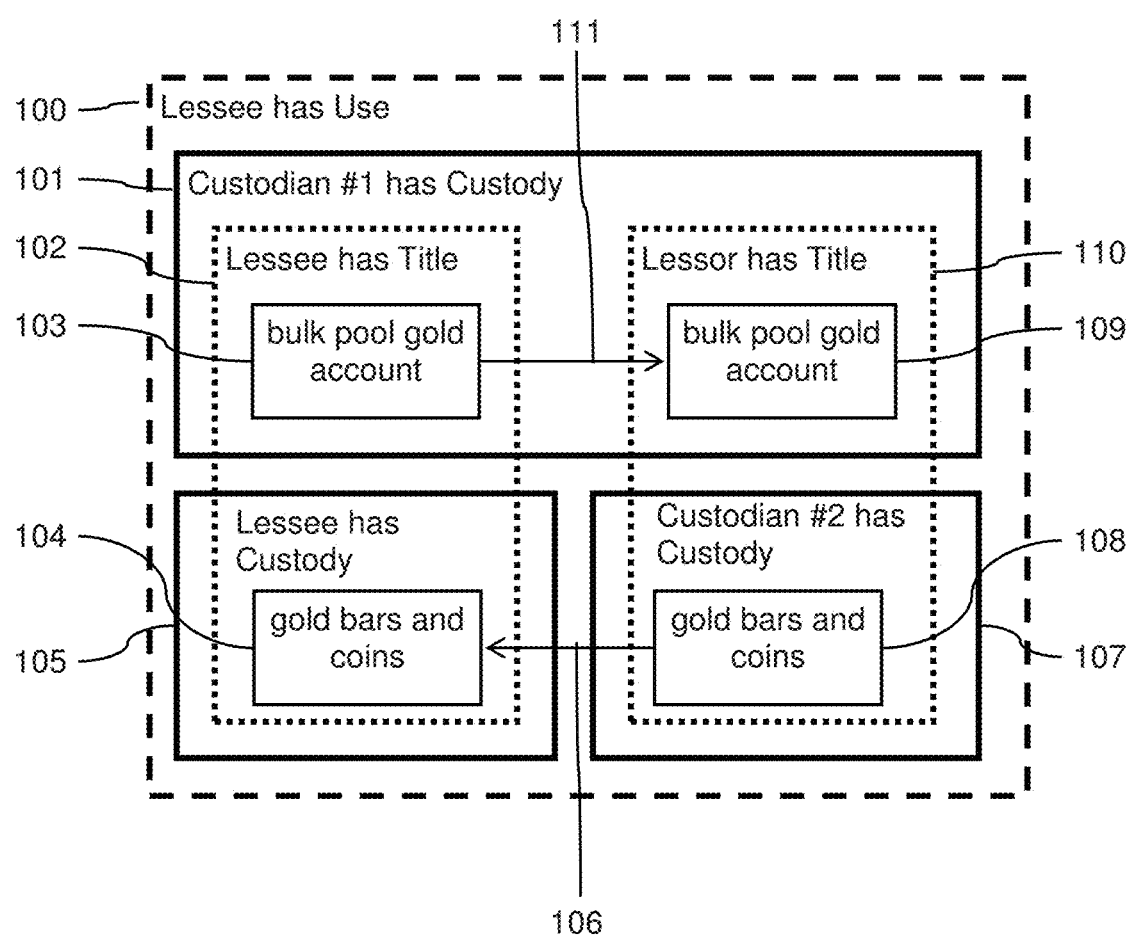
FIG. 5 is a system layout of an example of a first preferred system for a true gold lease.

FIG. 5 shows the first preferred system of a true gold lease. The lessor has title 110 to gold in a bulk pool gold account 109 held with custodian #1 101 and gold bars and coins 108 held with custodian #2 107. The lessee has title 102 to gold in a bulk pool gold account 103 held with custodian #1 101 and gold bars and coins 104 in its own possession 105. The lessee has usage rights 100 to all of the gold described above. When the lessee desires physical possession of the gold bars and coins 108 held by the lessor 110 with custodian #2 107, the lessee first transfers 111 bulk pool gold 103 to the lessor's account 109 with custodian #1 101. Upon receipt of this gold, the lessor then authorizes custodian #2 107 to ship 106 the gold bars and coins 108 to the lessee 104.

Figure 6:
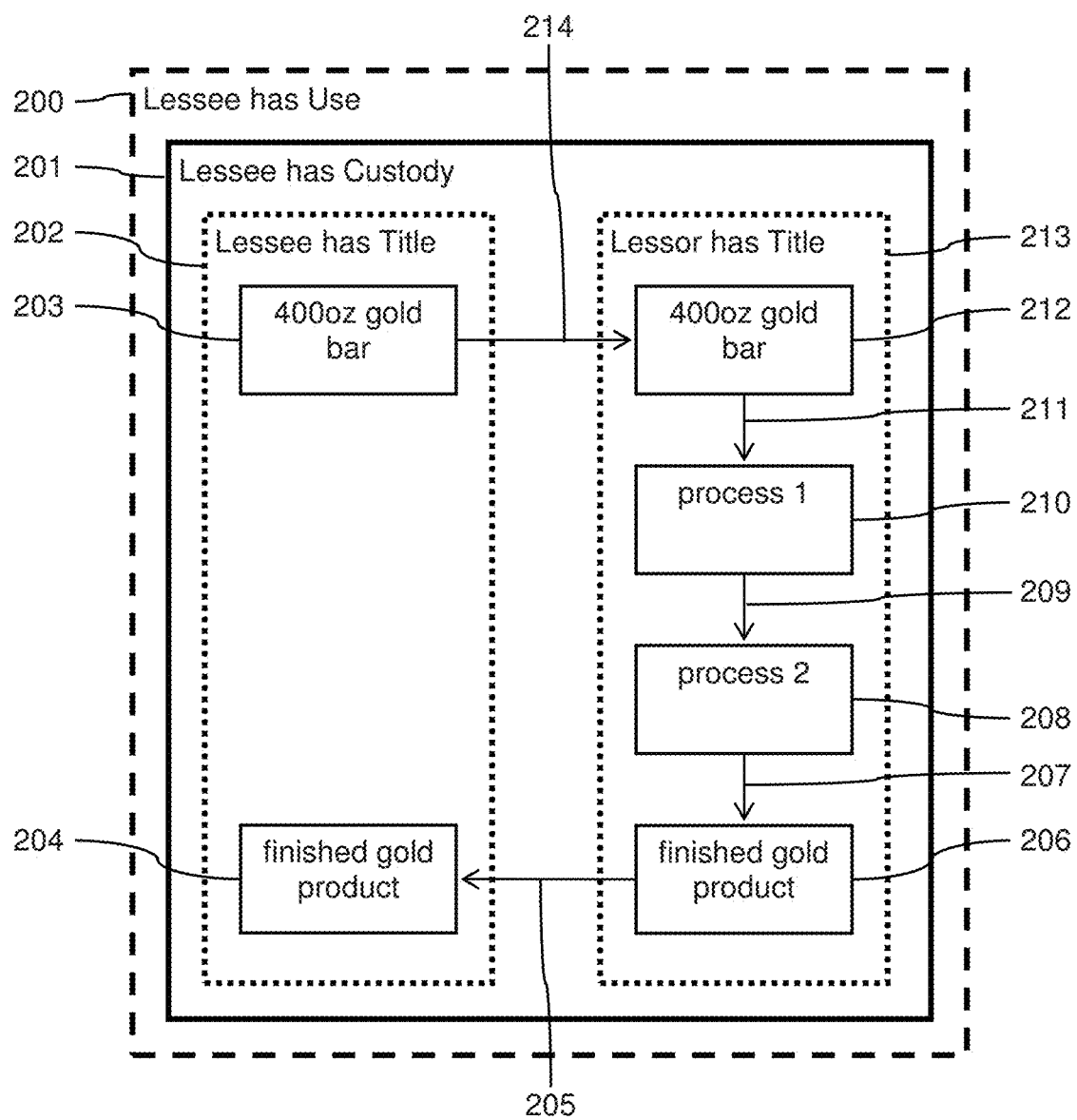
FIG. 6 is a system layout of an example of a second preferred system for a true gold lease.

FIG. 6 shows the second preferred system of a true gold lease. The lessee operates a manufacturing business that transforms 211, 209, 207 wholesale sized gold bars 212 through various processes 210, 208 into finished gold products 206 for sale. The lessee has usage rights 200 and physical custody 201 to the physical gold undergoing the transformations described above but the lessor has title 213 to that physical gold. When the lessee desires ownership (e.g. title) of finished gold product 206 owned by the lessor 213, which were outputted from the manufacturing process, so that it can sell the products, the lessee first acquires wholesale sized gold bars 203 and transfers 214 title to them to the lessor 213 at which point the lessee is then authorized to take ownership 205 of the finished gold products 206 and subsequently sell those products 204 that it now owns.

Figure 7:
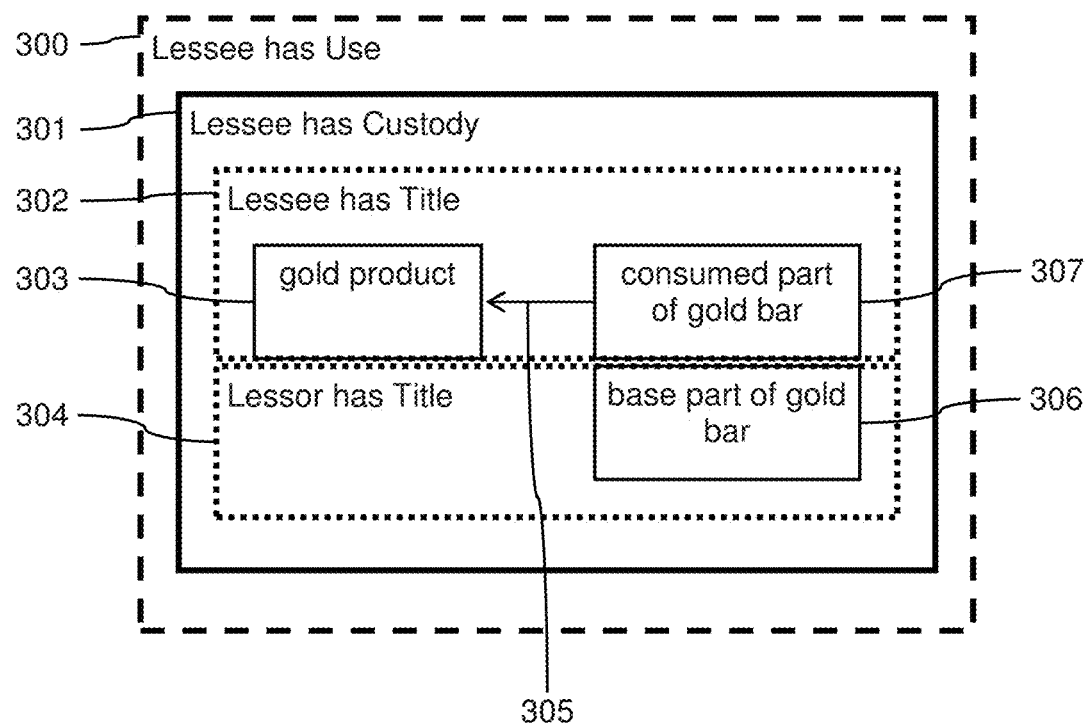
FIG. 7 is a system layout of an example of a third preferred system for a true gold lease.

FIG. 7 shows the third preferred system of a true gold lease. The lessee operates a manufacturing business that transforms 305 wholesale sized gold bars 306 & 307 combined through a process into gold products 303. The lessee has usage rights 300 and custody 301 of a wholesale sized gold bar 306 & 307 combined but only has title 302 to that part 307 of the bar that can be consumed by the process with the lessor having title 304 to that part 306 of the bar (the base amount) that the process cannot consume below.

Figure 8:
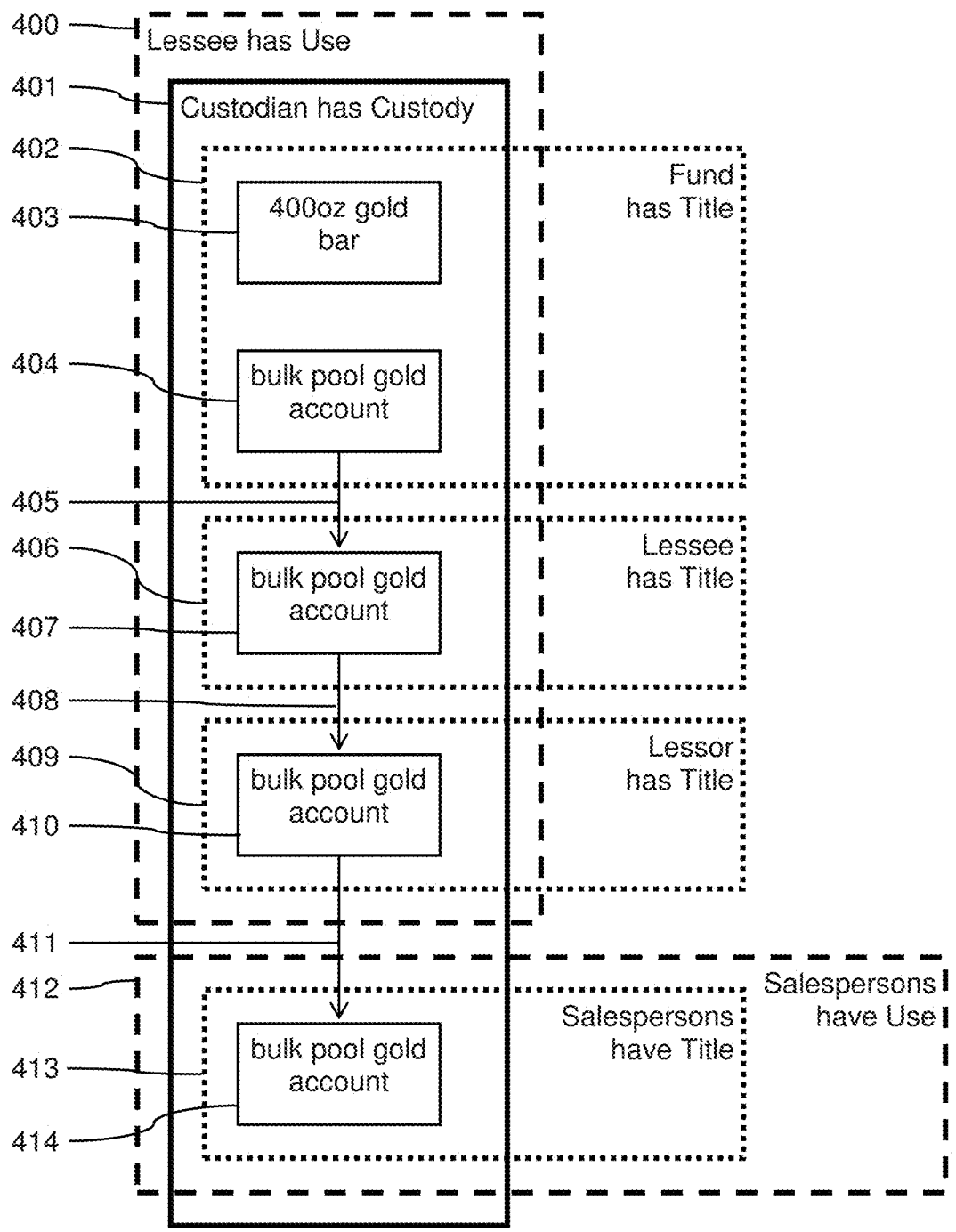
FIG. 8 is a system layout of an example of a fourth preferred system for a true gold lease.

FIG. 8 shows the fourth preferred system of a true gold lease. A lessee (fund manager) has management rights 400 of gold (held with a custodian 401 in the form of wholesale gold bars 403 and bulk pool gold account balances 404) owned by investors of a fund 402. In order to pay 411 the lessee's salespersons 412 and 413 an up-front gold commission into their gold accounts 414 held with the custodian 401, the lessee leases gold 410 from the lessor 409. As the fund's investors have a minimum investment period and the lessee has control 400 over the fund's gold 403 and 404, the lessee is assured that their management fees will be paid 405 to it from the fund's gold 404 into the lessee's gold account 407 and thus the lessor is assured that its lease will likewise be repaid 408.

Figure 9:
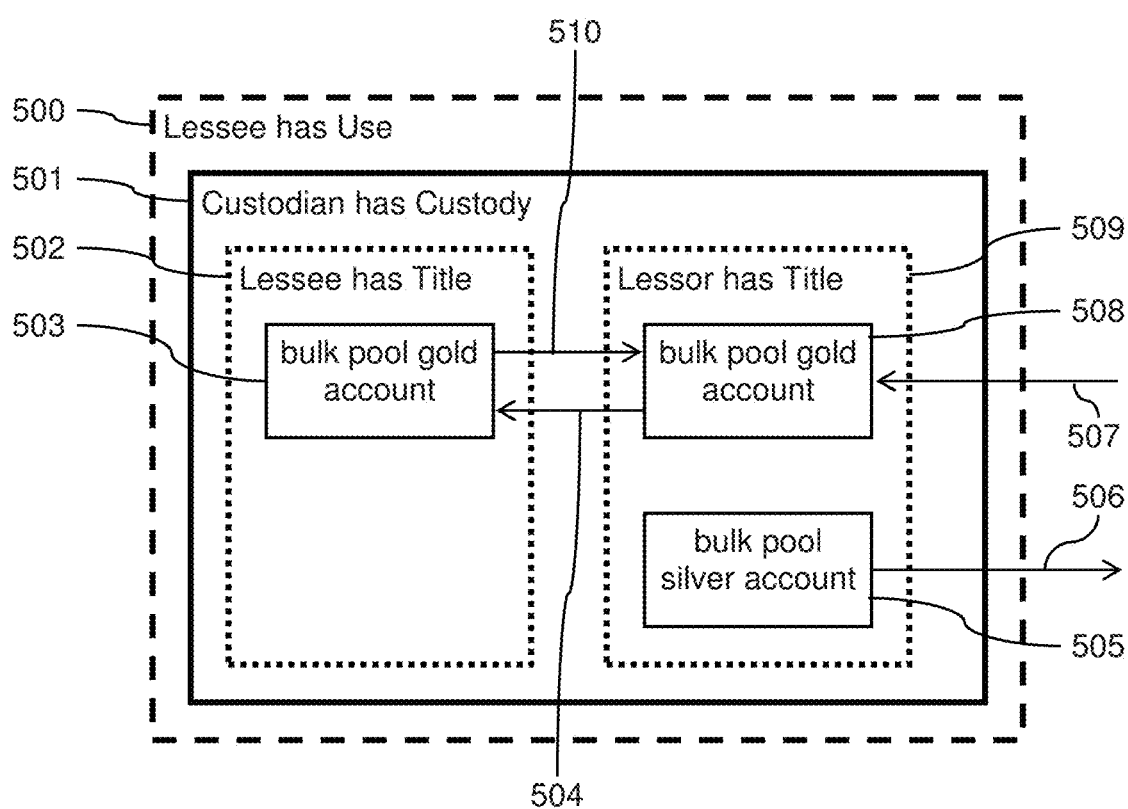
FIG. 9 is a system layout of an example of a fifth preferred system for a true gold lease.

FIG. 9 shows the fifth preferred system of a true gold lease. A lessee owns 502 gold 503 held with a custodian 501. In order to increase its leverage and trade the gold to silver ratio, the lessee leases 500 silver 505 from lessor 509 and sells 506 the silver in exchange 507 for gold 508. As the gold to silver ratio rises the lessee transfers 504 only that amount of gold from the lessor's 509 account 508 into the lessee's 502 account 503 such that the amount of gold 508 remaining in the lessor's 509 account 508 is sufficient to exchange for the amount of silver 505 that was originally leased. Likewise, if the gold to silver ratio falls, the lessee transfers 510 only that amount of gold from the lessee's 502 account 503 into the lessor's 509 account 508 such that the amount of gold 508 remaining in the lessor's 509 account 508 is sufficient to exchange for the amount of silver 505 that was originally leased.

Figure 10:
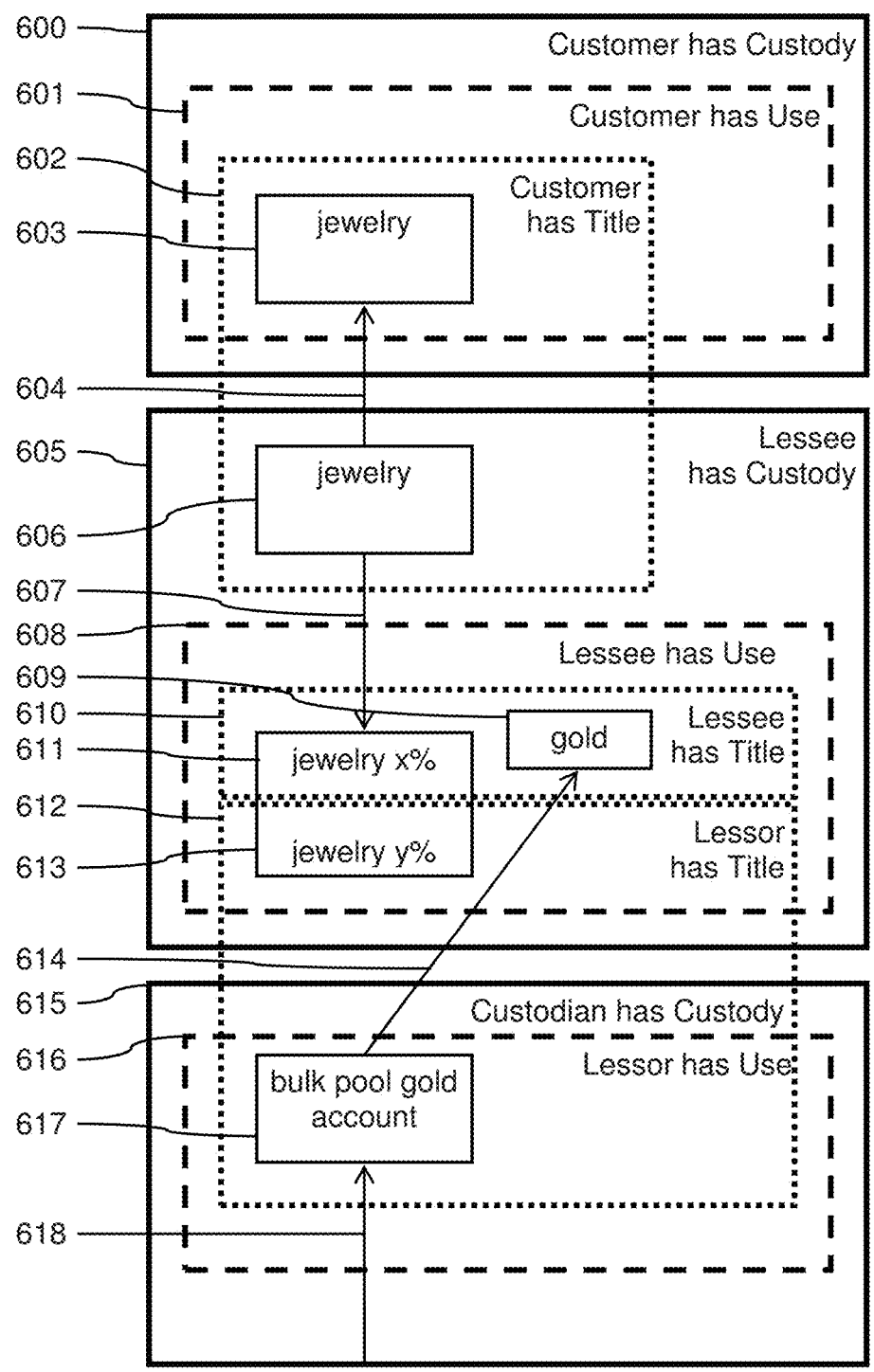
FIG. 10 is a system layout of an example of a seventh preferred system for a true gold lease.

FIG. 10 shows the seventh preferred system of a true gold lease. A pawn customer 600 with a gold item such as jewelry 606 signs a pawn loan agreement and gives the item to the lessee for custody 605 in exchange for a cash loan. Note that until the loan is repaid, the customer retains title 602 to the item 606 but neither the lessee or customer has any usage rights over the item. The lessor recognizes that the gold-collateralized loan is composed of a base Gold Asset plus a variable Paper Asset and so leases 614 gold 617 that it owns 612 to the lessee 609 who sells it for cash to fund the loan partially made to the customer. At the end of the loan term, there are two possible outcomes: the customer repays the loan or defaults.

In the repayment case, the item 606 is returned 604 to the customer's use 601 and possession 600 and the lessor uses part of the cash received from the customer to purchase 618 gold 617 to return to the lessor 612.

In the default case, the customer loses title 607 to the item 606 and the lessee takes control 608 of the item 611 and 613 at which point title to the item is split between the lessee 611 and the lessor 613 such that the lessor's original lease 614 is fully covered. The lessor may subsequently take possession of its gold 613 or re-lease it to the lessor 610.

Figure 11:
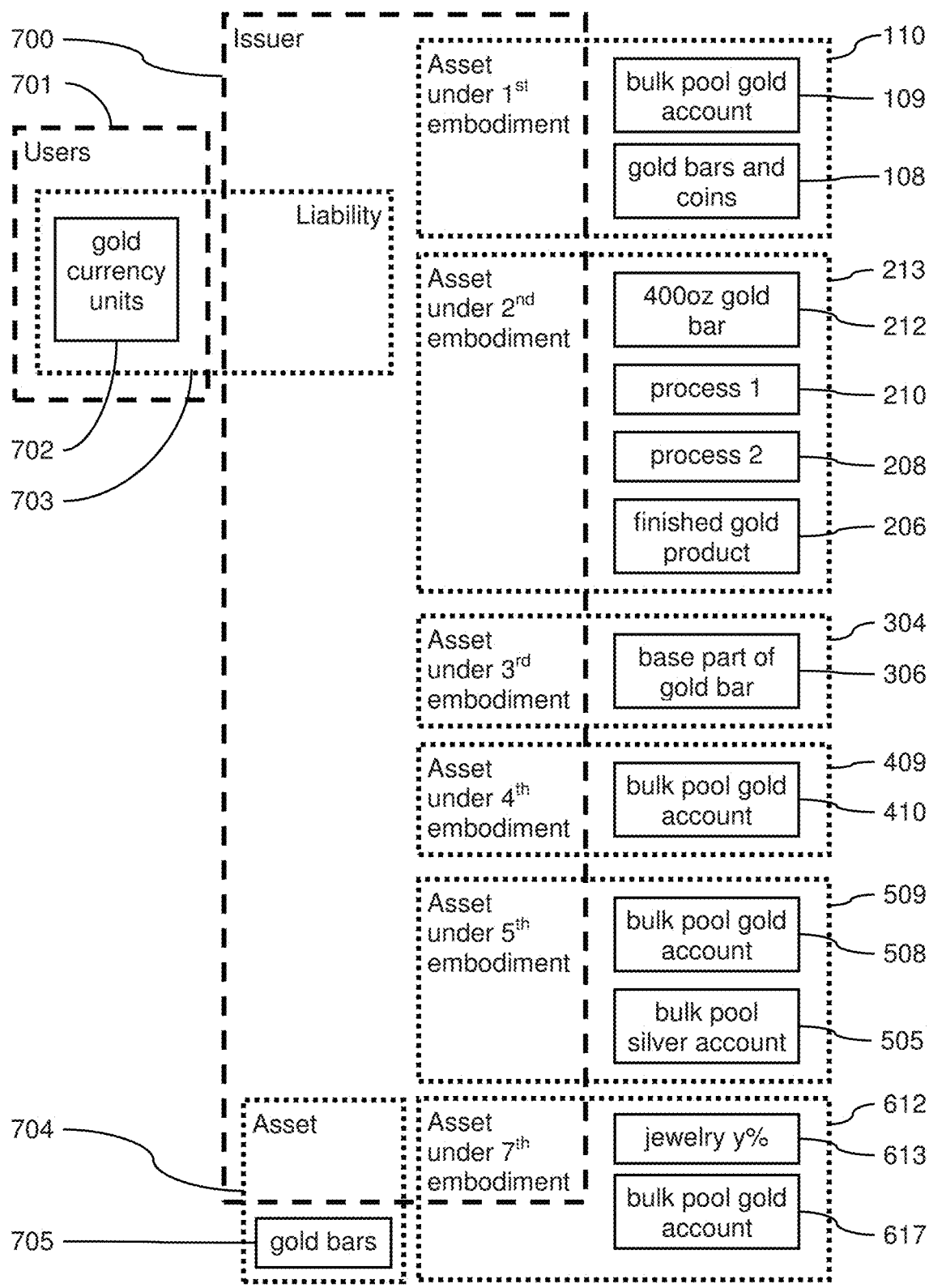
FIG. 11 is a system layout of an example of a gold backed currency system where the currency is separate from the gold.

FIG. 11 shows a gold backed currency system where the currency is separate from the gold. The currency issuer 700 issues gold currency units 702 to users 701 of the currency system. These gold currency units 702 are liabilities 703 of the issuer 700. In a conventional gold backed currency system, the issuer 700 would only back their liabilities 703 with an asset 704 being title to physical gold 705 held with a custodian. The system described herein teaches that the issuer 700 can also back its liabilities 703 with yield bearing physical gold assets as described below:

An asset as lessor holding title 110 to bulk pool gold account 109 and gold bars and coins 108 held under the first preferred system of a true gold lease. See FIG. 5 for more detail of the title, use, and custody of this structure.

An asset as lessor holding title 213 to 400 ounce gold bars 212, gold held in various form in manufacturing processes 210, 208 and finished gold product 206 held under the second preferred system of a true gold lease. See FIG. 6 for more detail of the title, use, and custody of this structure.

An asset as lessor holding title 304 to the base part of a gold bar 306 held under the third preferred system of a true gold lease. See FIG. 7 for more detail of the title, use, and custody of this structure.

An asset as lessor holding title 409 to bulk pool gold account 410 held under the fourth preferred system of a true gold lease. See FIG. 8 for more detail of the title, use, and custody of this structure.

An asset as lessor holding title 509 to bulk pool gold account 508 and bulk pool silver account 505 held under the fifth preferred system of a true gold lease. See FIG. 9 for more detail of the title, use, and custody of this structure.

An asset as lessor holding title 612 to bulk pool gold account 617 and an interest in physical gold jewelry 613 held under the seventh preferred system of a true gold lease. See FIG. 10 for more detail of the title, use, and custody of this structure.

Figure 12:
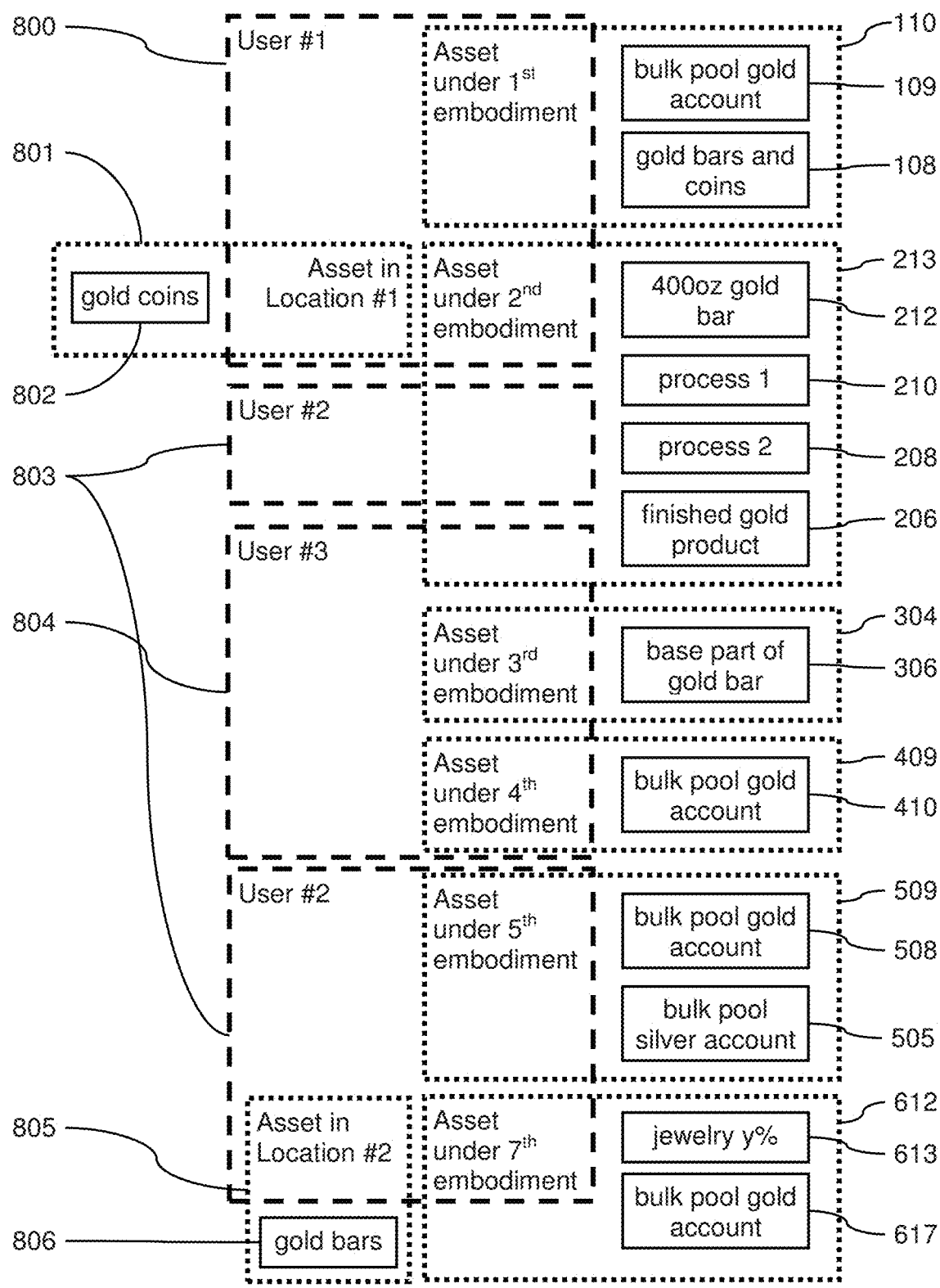
FIG. 12 is a system layout of an example of a preferred currency system where people directly own gold yield-paying investments.

FIG. 12 shows a preferred currency system where people directly own gold yield-paying investments rather than the system described in FIG. 11 with a currency unit separate and distinct from the physical gold metal, true gold leases, Gold Assets, and other gold yield-paying investments that back it. In FIG. 12, the concept of an issuer holding assets against liabilities is done away with and instead the users directly hold their preferred assets. For example, user #1 800 holds 801 gold coins 802 with a custodian in location #1 along with a true gold lease held under the first preferred system 110 and a share in a true gold lease held under the second preferred system 213. User #2 803 holds 805 gold bars 806 with a custodian in location #2 along with a share in a true gold lease held under the second preferred system 213; a true gold lease held under the fifth preferred system 509 and a share in a Gold Asset held under the seventh preferred system 612. User #3 804 holds a share in a true gold lease held under the second preferred system 213; a true gold lease held under the third preferred system 304 and a true gold lease held under the fourth preferred system 409.

FIG. 13 shows an exemplary system by which users holding a different mix of, or preference for, gold assets (as described in FIG. 12) can effect payments between each other. FIG. 13 considers a simple example of only two different assets but the process can be extended to multiple assets. For example, say there are two markets on the system, one for 1-ounce gold Eagle Coins located in New York 900 and 1-ounce gold Kangaroo Coins located in Sydney 903. On the system users quote bid prices in terms of dollar premiums per coin to buy Eagle coins 901, 902 and ask prices to sell Eagle coins 912, 913 as well as bid prices to buy Kangaroo coins 904, 905 and ask prices to sell Kangaroo coins 914, 915. Each of these markets is distinct. The system, however, can use the bid and ask price data to construct an implied market for the exchange/swap of Kangaroos and Eagles.

In the case of the Kangaroo for Eagles, market 906 prices represent offers to swap Kangaroos for Eagles. The system calculates the price of $10 907 by subtracting $20 904 from $30 912 as if say a User A accepted an offer in this market 906 the best price the system would obtain when selling User A's Kangaroos would be $20 as bid by User #5 904 and the best price it would pay to buy Eagles to deliver to User A would be the ask by User #3 912, so the system would need to charge $10 to breakeven. Similarly, the second best price by the system would be $12 908, being User #4's ask of $31 913 less User #6's bid of $19 905.

In the case of the Eagles for Kangaroo, market 909 prices represent offers to swap Eagles for Kangaroos. The system calculates the price of –$3 910 by subtracting $28 901 from $25 914 as if say a User B accepted an offer in this market 909 the best price the system would obtain when selling User B's Eagles would be $28 as bid by User #1 901 and the best price it would pay to buy Kangaroos to deliver to User B would be the ask by User #7 914, so the system could pay User B $3 to breakeven. Similarly, the second best price by the system would be –$1 911, being User #8's ask of $26 915 less User #2's bid of $27 902.

Thus in the situation where, for example a User B requests 10 ounces from a User A for the supply some product/service, with User B recording in the system a requirement for 1-ounce American Eagles in New York while User A holds 1-ounce Kangaroos in Sydney, the system would automatically quote a cost to User A of $10 per ounce 907 to effect the payment.

The two implied swap markets 906 and 909 also represent opportunities for users who have no preference for form or location of gold. Should they hold Eagles, then they may monitor the Eagles for Kangaroos 909 market (and others) and in this example be paid $3 910 to change the form of their gold to Kangaroos and the location of their gold to Sydney.

System Layouts and Flow Charts

The system layouts and/or flow charts (referred to in this paragraph jointly as diagrams) of this application illustrate methods and systems. It will be understood that each block of these diagrams, components of all or some of the blocks of these diagrams, and/or combinations of blocks in these diagrams, may be implemented by software (e.g. coding, software, computer program instructions, software programs, subprograms, or other series of computer-executable or processor-executable instructions), by hardware (e.g. processors, memory), by firmware, and/or a combination of these forms. As an example, in the case of software, computer program instructions (computer-readable program code) may be loaded onto a computer to produce a machine, such that the instructions that execute on the computer create structures for implementing the functions specified in the diagram block or blocks. These computer program instructions may also be stored in a memory that can direct a computer to function in a particular manner, such that the instructions stored in the memory produce an article of manufacture including instruction structures that implement the function specified in the diagram block or blocks. The computer program instructions may also be loaded onto a computer to cause a series of operational steps to be performed on or by the computer to produce a computer-implemented process such that the instructions that execute on the computer provide steps for implementing the functions specified in the diagram block or blocks. The term "loaded onto a computer" also includes being loaded into the memory of the computer or a memory associated with or accessible by the computer. The term "memory" is defined to include any type of computer (or other technology)-readable media including, but not limited to, attached storage media (e.g. hard disk drives, network disk drives, servers), internal storage media (e.g. RAM, ROM), removable storage media (e.g. CDs, DVDs, flash drives, memory cards, floppy disks), and/or other known or yet to be discovered storage media. The term "computer" is meant to include any type of processor, programmable logic device, or other type of known or yet to be discovered programmable apparatus. Accordingly, blocks of the diagrams support combinations of steps, structures, and/or modules for performing the specified functions. It will also be understood that each block of the diagrams, and combinations of blocks in the diagrams, may be divided and/or joined with other blocks of the diagrams without affecting the scope of the invention. This may result, for example, in computer-readable program code being stored in whole on a single memory, or various components of computer-readable program code being stored on more than one memory.

Figure 4:
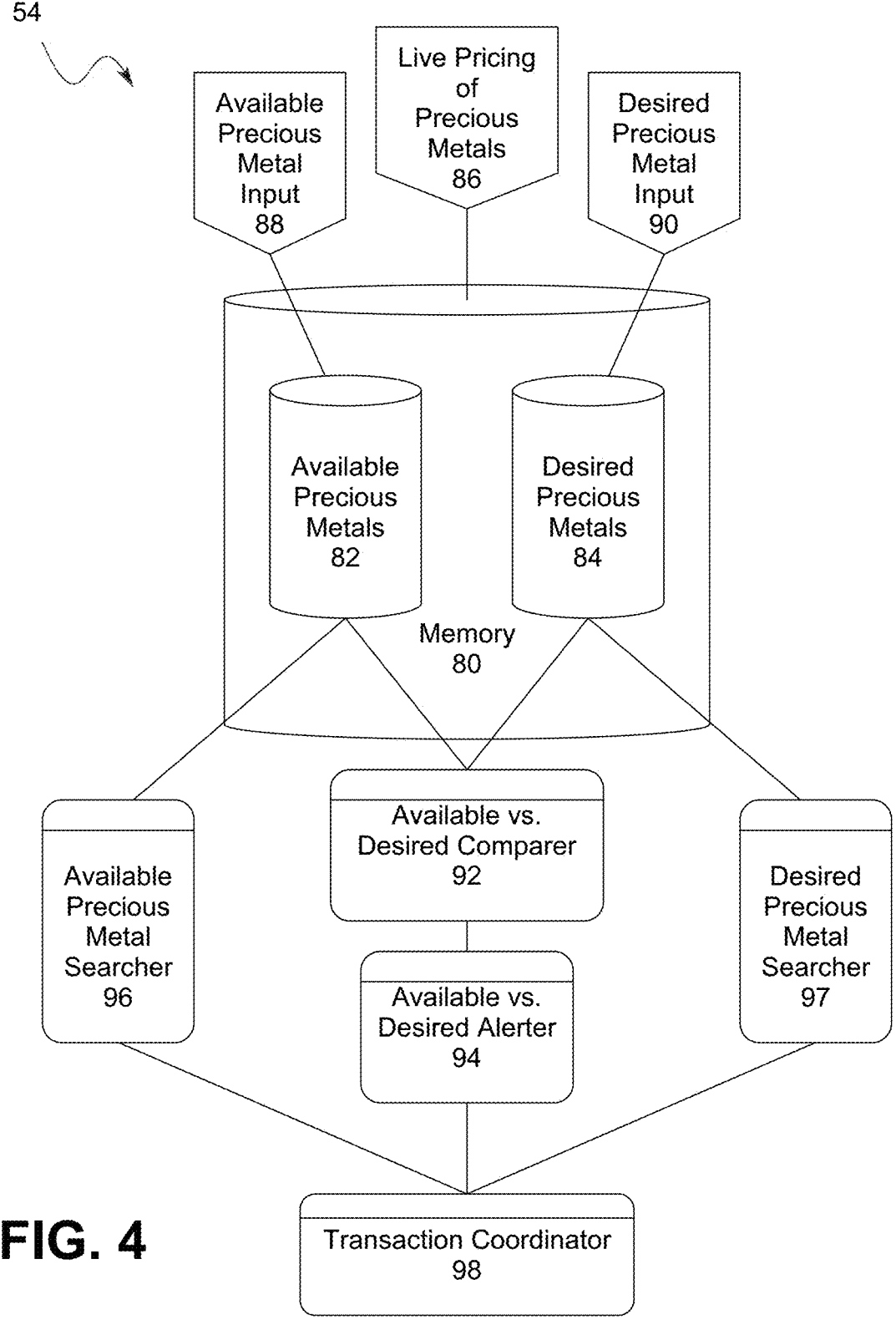
FIG. 4 is a simplified graphical representation of the system for trading precious metals in an efficient secondary market described herein.

Turning to FIG. 4, the trading system 54 described herein would have appropriate processors (not shown), memory 80, and input/output mechanisms (not shown) to allow the system to function as described herein. Although not shown, there may be at least one input mechanism (e.g. keyboard and mouse) and display screen that allows a programmer or operator to access and view the system directly. The system is capable of displaying, for example, horizontal spreads as net prices and providing ways to allow users to indicate in which kinds of horizontal spreads they are interested.

Input may come in the form of either live bid and offer prices from operators of public exchanges where precious metal futures or other contracts trade (refer to FIG. 3C, 63) or live spot over-the-counter bid and offer prices from Bullion Banks and other professional trading firms (refer to FIG. 3C, 65) that price precious metals 86. This live pricing forms the "metal value" component of the precious metal "gross price" and may be combined with the "premium" component in both the available precious metal memory 82 and/or the desired precious metal memory 84. Input 88 to the available precious metal memory 82 preferably includes a "premium" component set by the offeror/seller along with other information about the precious metal being offered (e.g. location). Input 90 to the desired precious metal memory 84 preferably includes a "premium" component set by the bidder/buyer along with other information about the precious metal that is desired (e.g. location).

A comparer 92 may be used to compare the available precious metals from the available precious metal memory 82 and the desired precious metals from the desired precious metal memory 84. If there were a "match," the appropriate buyers and/or sellers would be alerted using the alerter 94. The alerter has appropriate output mechanisms to send or transmit alerts using, for example, text messaging, pop-ups, or emails. The relevant parties can complete the transaction using the transaction coordinator 98. The transaction coordinator 98 has appropriate user interfaces to allow the relevant parties to access the system 54 and complete the transaction.

The available precious metal memory 82 may be searched using an available precious metal searcher 96. If there is a "match" in that the desired precious metal is found, the relevant parties can complete the transaction using the transaction coordinator 98. The transaction coordinator 98 has appropriate user interfaces to allow the relevant parties to access the system 54 and complete the transaction.

The desired precious metal memory 84 may be searched using a desired precious metal searcher 97. If there is a "match" in that the desired precious metal is found, the relevant parties can complete the transaction using the transaction coordinator 98. The transaction coordinator 98 has appropriate user interfaces to allow the relevant parties to access the system 54 and complete the transaction.

Basic Hardware/Software

The methods disclosed herein include one or more steps, actions, and/or functions for achieving the described actions and results. The methods' steps, actions, and/or functions may be interchanged with one another without departing from the scope of the present invention. In other words, unless a specific order of steps, actions, and/or functions is required for proper or operative operation of the system described herein, the order and/or use of specific steps, actions, and/or functions may be modified without departing from the scope of the present invention.

The steps, actions, and/or functions of the methods may be controlled using one or more computers that are controlled by one or more programs (or subprograms thereof). The computers, in turn, may control the system described herein or components thereof.

Exemplary computers include at least one associated "processing unit" and at least one associated "memory." A processing unit may be a processor (or other known or yet to be discovered processing device) that is capable of implementing steps or actions or directing (directly or indirectly) other components to implement steps or actions. Memory is any computer-readable storage media including non-transitory memory (e.g. RAM memory, flash memory, ROM memory, EPROM memory, EEPROM memory, registers, hard disk, a removable disk, a CD-ROM, a USB drive, or any other form of known or yet to be discovered storage media means). The system described herein may be embodied in software, firmware, hardware and other forms that achieve the function described herein.

Exemplary programs may be implemented as software or other forms of computer instructions (e.g. computer-readable program code) that may be loaded into computer memory to produce a machine, such that the instructions that execute on the computer create structures for implementing the steps, actions, or functions described herein.

The system described herein may be adapted to many environments with varying computing devices, operating systems, printing devices, network hardware and software, applications and other variables. Skilled artisans may implement the described functionality in varying ways for each particular application, but such implementation decisions should not be interpreted as causing a departure from the scope of the present invention.

Miscellaneous

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references (including, but not limited to, publications (including websites), patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following numbered claims are intended to cover all of the generic and specific features of the invention herein described and all statements of the scope of the invention that, as a matter of language, might be said to fall therebetween.

What is claimed is:

1. A system for trading precious metals in an efficient secondary market, said system facilitating bidding/accepting transactions between a bidder/buyer and an accepter/seller, said system facilitating offering/taking transactions between an offeror/seller and a taker/buyer, said system comprising:
    (a) an available precious metal memory and a desired precious metal memory;
    (b) the available precious metal memory coupled to a primary market and the secondary market:
        (i) the available precious metal memory receiving live price information input from the primary market, the live price information identifying a current reference price for precious metal; and
        (ii) the available precious metal memory receiving transaction offer information input of available precious metal from the secondary market, the transaction offer information indicating a product type, and a first spread price required by an offeror/seller of a precious metal product of the product type, the spread of the first spread price being referenced to the current reference price;
    (c) the desired precious metal memory coupled to the primary market and the secondary market:
        (i) the desired precious metal memory receiving live price information input from the primary market, the live price information identifying the current reference price for precious metal; and
        (ii) the desired precious metal memory receiving transaction bid information input of desired precious metal from the secondary market, the transaction bid information indicating a product type and a second spread price required by the bidder/buyer of a precious metal product of the product type, the spread of the second spread price being referenced to the current reference price;
    (d) a comparer coupled to the available precious metal memory and to the desired precious metal memory, the comparer comprising circuitry to:
        (i) automatically calculate a gross offer price based on both the current reference price and the first spread price;
        (ii) automatically calculate a gross bid price based on both the current reference price and the second spread price; and
        (iii) identify, based on the gross offer price and the gross bid price, a match between the transaction offer information and the transaction bid information; and
    (e) a transaction coordinator, coupled to the comparer, to provide an interface, based on the match, to enable a commercial transaction of the precious metal product;
    (f) wherein said system facilitates a bidding/accepting transaction.

2. The system of claim 1, further comprising:
    an available precious metal searcher to perform a first search of the available precious metal memory based on the product type; and
    a desired precious metal searcher to perform a second search of the desired precious metal memory based on the product type, wherein the transaction coordinator is further coupled to receive respective results of the first search and the second search.

3. The system of claim 1, further comprising:
    a comparer for comparing available precious metals in said available precious metal memory with desired precious metals in said desired precious metal memory; and
    an alerter to send alerts to the transaction coordinator in response to a detection of the match by the comparer.

4. A computer-implemented method for trading precious metals in an efficient secondary market executed using a trading system, said method facilitating bidding/accepting transactions between a bidder/buyer and an accepter/seller, said method facilitating offering/taking transactions between an offeror/seller and a taker/buyer, said method comprising:
    (a) at an available precious metal memory of said trading system, receiving:
        (i) live price information input from a primary market, the live price information identifying a current reference price for precious metal; and
        (ii) transaction offer information input of available precious metal from the secondary market, the transaction offer information indicating a product type, and a first spread price required by an offeror/seller of a precious metal product of the product type, the spread of the first spread price being referenced to the current reference price;
    (b) at a desired precious metal memory of said trading system, receiving;
        (i) live price information input from the primary market, the live price information identifying the current reference price for precious metal; and
        (ii) transaction bid information input of desired precious metal from the secondary market, the transaction bid information indicating a product type and a second spread price required by the bidder/buyer of a precious metal product of the product type, the spread of the second spread price being referenced to the current reference price;
    (c) with a comparer coupled to the available precious metal memory and to the desired precious metal memory:
        (i) automatically calculating a gross offer price based on both the current reference price and the first spread price;
        (ii) automatically calculating a gross bid price based on both the current reference price and the second spread price; and (iii) identifying, based on the gross offer price and the gross bid price, a match between the transaction offer information and the transaction bid information;

(d) using a transaction coordinator of said trading system, providing an interface, based on the match, to enable a commercial transaction of the precious metal product; and (e) facilitating a bidding/accepting transaction using said trading system, wherein the transaction offer information indicates the first spread price as a percentage of the current reference price.

5. The method of claim 4, further comprising:

with an available precious metal searcher of the trading system, performing a first search of the available precious metal memory based on the product type;

with a desired precious metal searcher of the trading system, performing a second search of the desired precious metal memory based on the product type; and providing respective results of the first search and the second search to the transaction coordinator.

6. The method of claim 5, wherein said available precious metal searcher is implemented as an application running on said trading system, said desired precious metal searcher is implemented as an application running on said trading system, or said transaction coordinator is implemented as an application running on said trading system.

7. The system of claim 1, wherein the spread of the first spread price and the second spread price is specified in a currency or a different metal.

8. The system of claim 1, wherein the spread of the first spread price and the second spread price is specified as a percentage of the current reference price.

9. The system of claim 1, the prices of precious metal commodities rapidly fluctuate in the primary market, and the secondary market is for trading particular precious metal products at a premium above or a discount below the prices of the primary market.

10. The method of claim 5, wherein the spread price is specified in a currency or a different metal.

11. The method of claim 5, wherein the spread price is specified as a percentage of the current reference price.

12. The method of claim 5, wherein the prices of precious metal commodities rapidly fluctuate in the primary market, and wherein the secondary market is for trading particular precious metal products at a premium above or a discount below the prices of the primary market.

* * * * *